(12) United States Patent
Narita

(10) Patent No.: US 8,991,252 B2
(45) Date of Patent: Mar. 31, 2015

(54) DISPLACEMENT AMOUNT MONITORING ELECTRODE ARRANGEMENT

(75) Inventor: Katsutoshi Narita, Miyoshi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/579,089

(22) PCT Filed: Aug. 26, 2011

(86) PCT No.: PCT/JP2011/069333
§ 371 (c)(1),
(2), (4) Date: Aug. 15, 2012

(87) PCT Pub. No.: WO2013/030907
PCT Pub. Date: Mar. 7, 2013

(65) Prior Publication Data
US 2014/0174182 A1  Jun. 26, 2014

(51) Int. Cl.
*G01P 15/125* (2006.01)
*G01C 19/56* (2012.01)
*G01C 19/5747* (2012.01)

(52) U.S. Cl.
CPC .......... *G01P 15/125* (2013.01); *G01C 19/5747* (2013.01)
USPC .................................. 73/514.32; 73/504.14

(58) Field of Classification Search
USPC ............... 73/514.32, 514.38, 514.36, 504.12, 73/504.14, 504.04
See application file for complete search history.

(56) References Cited

U.S. PATENT DOCUMENTS

| | | | |
|---|---|---|---|
| 5,827,980 A | 10/1998 | Doemens et al. | |
| 5,945,599 A | 8/1999 | Fujiyoshi et al. | |
| 6,122,964 A * | 9/2000 | Mohaupt et al. | 73/514.32 |
| 6,543,285 B2 * | 4/2003 | Hashimoto | 73/504.14 |
| 7,258,010 B2 * | 8/2007 | Horning et al. | 73/514.32 |
| 7,444,873 B2 * | 11/2008 | Robert | 73/514.32 |
| 7,797,998 B2 * | 9/2010 | Menard et al. | 73/514.18 |

(Continued)

FOREIGN PATENT DOCUMENTS

| | | |
|---|---|---|
| DE | 10 2007 033 001 | 1/2009 |
| DE | 10 2009 028 924 | 3/2011 |

(Continued)

OTHER PUBLICATIONS

U.S. Appl. No. 14/236,966, filed Feb. 4, 2014.

*Primary Examiner* — Helen Kwok
(74) *Attorney, Agent, or Firm* — Finnegan, Henderson, Farabow, Garrett & Dunner, LLP

(57) ABSTRACT

According to a displacement amount monitoring electrode arrangement, there are a linear change region in which the change amount of capacitance changes linearly with the displacement of the movable electrode in the predetermined axis direction, and a nonlinear change region in which the change amount of the capacitance changes nonlinearly with the displacement of the movable electrode in the predetermined axis direction. The nonlinear change region includes a characteristic in which a change sensitivity of the change amount of the capacitance with respect to the displacement amount of the movable electrode in the predetermined axis direction is greater than that in the linear change region, and a target capacitance change amount of the capacitance when the displacement of the movable electrode in the predetermined axis direction reaches a target displacement amount corresponding to the target amplitude is set in the nonlinear change region.

7 Claims, 20 Drawing Sheets

(56) References Cited

U.S. PATENT DOCUMENTS

| | | |
|---|---|---|
| 2001/0013253 A1 | 8/2001 | Hashimoto |
| 2011/0050251 A1 | 3/2011 | Franke et al. |

FOREIGN PATENT DOCUMENTS

| | | |
|---|---|---|
| JP | 10-504386 | 4/1998 |
| JP | 11-190635 | 7/1999 |
| JP | 2000-55670 | 2/2000 |
| JP | 2000-266777 | 9/2000 |
| JP | 2001-50704 | 2/2001 |
| JP | 2001-227954 | 8/2001 |
| JP | 2004-233088 | 8/2004 |
| JP | 2007-501938 | 2/2007 |
| JP | 2008-170402 | 7/2008 |
| JP | 2008-170455 | 7/2008 |

* cited by examiner

US 8,991,252 B2

DISPLACEMENT AMOUNT MONITORING ELECTRODE ARRANGEMENT

CROSS-REFERENCE TO RELATED APPLICATIONS

This application is a national phase application of International Application No. PCT/JP2011/069333, filed Aug. 26, 2011, the content of which is incorporated herein by reference.

TECHNICAL FIELD

The present invention is related to a displacement amount monitoring electrode arrangement. In particular, the present invention is related to a displacement amount monitoring electrode arrangement in which a fixed electrode fixed with respect to a substrate and a movable electrode configured to be movable in a predetermined axis direction parallel to the substrate, each of which has a comb shape formed by a base portion and plural electrode fingers extending from the base portion in the predetermined axis direction, are arranged such that the electrode fingers of the fixed electrode are engaged with the electrode fingers of the movable electrode, wherein the displacement amount monitoring electrode arrangement is configured to monitor a displacement amount of a detection mass which is to be driven to have target amplitude based on a change amount of a capacitance between the fixed electrode and the movable electrode.

BACKGROUND ART

JP 2008-170455 A discloses a displacement amount monitoring electrode arrangement for an angular velocity sensor, etc., which is configured to monitor a displacement amount of a detection mass so as to drive the detection mass with constant target amplitude. The displacement amount monitoring electrode includes a fixed electrode with a comb shape and a movable electrode with a comb shape. The fixed electrode is formed by a base portion and plural electrode fingers extending from the base portion in a predetermined axis direction, and is fixed with respect to a substrate. The movable electrode is formed by a base portion and plural electrode fingers extending from the base portion in the predetermined axis direction parallel to the substrate, and is movable in the predetermined axis direction with respect to the substrate. In such a displacement amount monitoring electrode, when the movable electrode is displaced in the predetermined axis direction with respect to the substrate, a capacitance between the fixed electrode and the movable electrode changes. At that time, a change amount of the capacitance depends on the displacement amount of the movable electrode. Then, the displacement amount (amplitude) of the detection mass is monitored based on the change amount of the capacitance, and the detection mass is controlled such that it is driven to have target amplitude.

In general, the change amount of the capacitance between the fixed electrode and the movable electrode changes linearly with the amplitude of the detection mass; however, it changes because of not only the amplitude of the detection mass but also a gap and an opposed area between the fixed electrode and the movable electrode. Specifically, if the gap and the opposed area change due to variations in stress or dimensions, etc., sensitivity (i.e., a gradient) of the change amount of the capacitance with respect to the displacement amount of the movable electrode changes accordingly. According to a configuration in which a target capacitance change amount of the capacitance when the detection mass is driven with the target amplitude (i.e., when the displacement of the movable electrode in the predetermined axis direction reaches a target displacement amount corresponding to the target amplitude) is set in the linear change region in which the change amount of the capacitance changes linearly with the displacement of the movable electrode, if the gap and the opposed area don't match with desired values due to the stress applied at the time of assembling the monitoring electrode, temperature change, variation in the dimensions, etc., there may be a case where the displacement amount of the movable electrode does not match the target displacement amount when the change amount of the capacitance reaches the target capacitance change amount, which makes it difficult to keep the amplitude of the detection mass at a constant target amplitude.

SUMMARY OF INVENTION

The present invention is made in consideration of the matters as described above, and it is an object of the present invention to provide a displacement amount monitoring electrode arrangement which can maintain amplitude of a detection mass at a constant target amplitude even if a relative relationship between a fixed electrode and a movable electrode changes.

The objects are achieved by a displacement amount monitoring electrode arrangement in which a fixed electrode fixed with respect to a substrate and a movable electrode configured to be movable in a predetermined axis direction parallel to a substrate, each of which has a comb shape formed by a base portion and plural electrode fingers extending from the base portion in the predetermined axis direction, are arranged such that the electrode fingers of the fixed electrode are engaged with the electrode fingers of the movable electrode, wherein the displacement amount monitoring electrode arrangement is configured to monitor a displacement amount of a detection mass which is to be driven to have a target amplitude based on a variation in a capacitance between the fixed electrode and the movable electrode, there are at least one linear change region in which the variation in the capacitance changes linearly with the displacement of the movable electrode in the predetermined axis direction, and at least one nonlinear change region in which the variation in the capacitance changes nonlinearly with the displacement of the movable electrode in the predetermined axis direction, the nonlinear change region includes a characteristic in which a change sensitivity of the variation in the capacitance with respect to the displacement amount of the movable electrode in the predetermined axis direction is greater than that in the linear change region, and a target capacitance change amount of the capacitance when the displacement of the movable electrode in the predetermined axis direction reaches a target displacement amount corresponding to the target amplitude is set in the nonlinear change region.

According to the present invention, it is possible to maintain amplitude of a detection mass at constant target amplitude even if a relative relationship between a fixed electrode and a movable electrode changes.

EXPLANATION FOR REFERENCE NUMBERS 10, 28-1, 28-2, 30-1, 30-2, 100 displacement amount monitoring electrode
14 semiconductor substrate
16, 18 structure body
32 fixed electrode
34 movable electrode
32-1, 34-1 base portio
32-2, 34-2 electrode finger
102-1, 102-2, 104-1, 104-2 dielectric material

BEST MODE FOR CARRYING OUT THE INVENTION

In the following, concrete embodiments of a displacement amount monitoring electrode according the present invention will be described in detail by referring to the accompanying drawings.

First Embodiment

Figure 1:
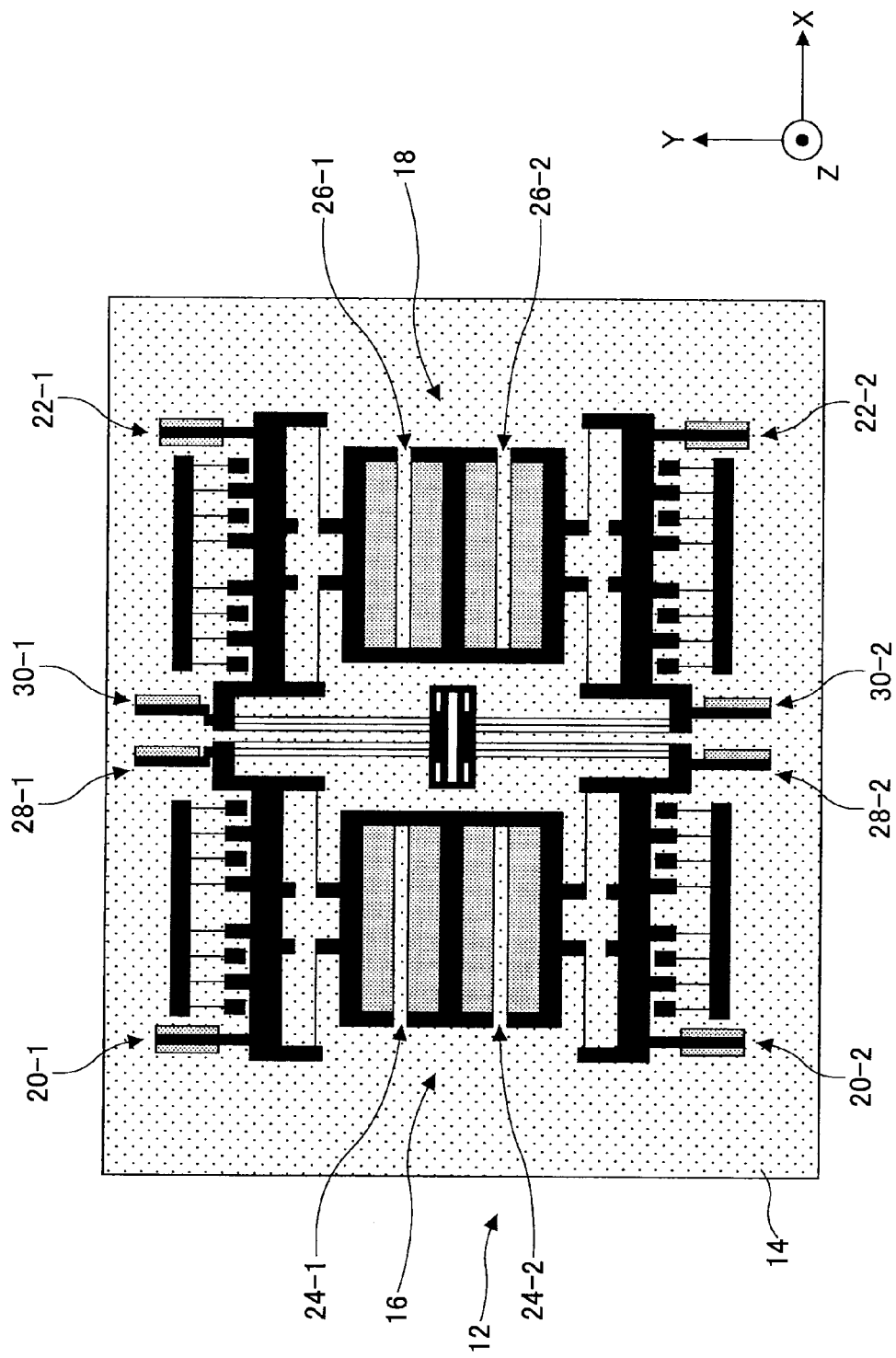
FIG. 1 is a diagram of a configuration of a sensor which adopts a displacement amount monitoring electrode arrangement according to a first embodiment of the present invention.

FIG. 1 is a diagram of a configuration of a sensor 12 which adopts a displacement amount monitoring electrode arrangement 10 according to a first embodiment of the present invention. The sensor 12 according to the embodiment is an angular velocity sensor which is provided on a vehicle, for example, for detecting an angular velocity around a Z axis perpendicular to an X-Y plane. The sensor 12 is formed on a semiconductor substrate 14 such as silicon. The sensor 12 is formed by performing etching on a surface of the semiconductor substrate 14 with a micromachining technique.

The sensor 12 includes a pair of structure bodies 16, 18 having the same mass; drive electrodes 20-1, 20-2, 22-1, 22-2 for driving the structure bodies 16, 18 in an X axis direction on the semiconductor substrate 14; detection electrodes 24-1, 24-2, 26-1, 26-2 for detecting vibrations (amplitudes) of the structure bodies 16, 18 in a Y axis direction on the semiconductor substrate 14; and displacement amount monitoring electrodes 28-1, 28-2, 30-1, 30-2 for monitoring drive displacement amounts of the structure bodies 16, 18 in the X axis direction. The structure bodies 16, 18 are disposed symmetrically with each other on the semiconductor substrate 14 such that the structure bodies 16, 18 are floated over the surface of the semiconductor substrate 14, which forms an insulating layer, by a predetermined distance. Hereinafter, the displacement amount monitoring electrodes 28-1, 28-2, 30-1, 30-2 are also referred to as a displacement amount monitoring electrode 10 collectively.

Each of the drive electrodes 20-1, 20-2, 22-1, 22-2 and the detection electrodes 24-1, 24-2, 26-1, 26-2 includes a fixed electrode fixed with respect to the substrate 14 and a movable electrode configured to be movable in the X or Y axis direction parallel to the substrate 14. The fixed electrodes are connected to a signal processing part via pads. Further, the movable electrodes form parts of the structure bodies 16, 18.

The drive electrodes 20-1, 20-2, 22-1, 22-2 apply drive voltages to the fixed electrodes to generate electrostatic attraction between the fixed electrodes and the movable electrodes in order to drive the structure bodies 16, 18 with respect to the semiconductor substrate 14 in the X axis direction. Further, the detection electrodes 24-1, 24-2, 26-1, 26-2 detect changes in capacitances between the fixed electrodes and the movable electrodes due to the displacements of the structure bodies 16, 18 in the Y axis direction in order to detect vibrations of the structure bodies 16, 18 in the Y axis direction with respect to the semiconductor substrate 14.

Specifically, the drive electrodes 20-1, 20-2, 22-1, 22-2 generate the electrostatic attraction between the fixed electrodes and the movable electrodes by applying the drive voltages whose frequencies are substantially the same as a resonance frequency of the structure bodies 16, 18 to the fixed electrodes in order to generate drive forces for driving the structure bodies 16, 18 with constant amplitudes in the X axis direction with frequencies which are substantially the same as the resonance frequency of the structure bodies 16, 18. It is noted that the drive electrodes 20-1, 20-2 generate the drive forces in phase and the drive electrodes 22-1, 22-2 generate the drive forces in phase, while the drive electrodes 20-1, 20-2 generate the drive forces in opposite phase with respect to the drive electrodes 22-1, 22-2.

Further, in the detection electrodes 24-1, 24-2, 26-1, 26-2, capacitance changes occur between the fixed electrodes and the movable electrodes according to the vibration displacements of the structure bodies 16, 18 in the Y axis direction with respect to the semiconductor substrate 14. It is noted that the capacitance changes in the detection electrodes 24-1, 24-2 are in opposite phase with respect to the capacitance changes in the detection electrodes 26-1, 26-2. The capacitance changes in the detection electrodes 24-1, 24-2, 26-1, 26-2 are substantially zero when the vibration displacement amounts of the structure bodies 16, 18 in the Y axis direction are zero. The greater the vibration displacement amounts of the structure bodies 16, 18 in the Y axis direction are, the greater the capacitance changes in the detection electrodes 24-1, 24-2, 26-1, 26-2 become. The detection electrodes 24-1, 24-2, 26-1, 26-2 output the capacitance changes between the fixed electrodes and the movable electrodes as detection displacement signals to a signal processing circuit. The signal processing circuit processes the detection signals from the detection electrodes 24-1, 24-2, 26-1, 26-2 to detect the vibration displacement amounts of the structure bodies 16, 18 in the Y axis direction and detect the angular velocity around the Z axis based on the vibration displacement amounts.

In the following, an operation of the sensor 12 according to the embodiment will be described.

If the detection of the angular velocity around the Z axis which is perpendicular to the X and Y axes is performed, the drive electrodes 20-1, 20-2, 22-1, 22-2 in the sensor 12 are driven. Specifically, the drive voltages which have the same frequency as the resonance frequency of the structure bodies 16, 18 are applied to the fixed electrodes of the drive electrodes 20-1, 20-2, 22-1, 22-2. If such drive voltages are applied to the drive electrodes 20-1, 20-2, 22-1, 22-2, drive forces for exciting the structure bodies 16, 18 in the X axis direction are generated between the fixed electrodes and the movable electrodes of the respective drive electrodes 20-1, 20-2, 22-1, 22-2. Thus, the structure bodies 16, 18 are excited with constant amplitudes in opposite phase in the X axis direction at a frequency which is substantially the same as the resonance frequency.

If the angular velocity around the Z axis is not generated under a status where the structure bodies 16, 18 are excited in the X axis direction as described above, a Coriolis force does not act on the structure bodies 16, 18. In this case, the detection electrodes 24-1, 24-2, 26-1, 26-2 are not oscillated in the Y axis direction, and thus there is no change in capacitance between the fixed electrodes and the movable electrodes of the detection electrodes 24-1, 24-2, 26-1, 26-2. As a result of this, the detection displacement signals output from the detection electrodes 24-1, 24-2, 26-1, 26-2 represent that the amplitudes of the structure bodies 16, 18 in the Y axis direction is substantially zero.

On the other hand, if the angular velocity around the Z axis is generated under a status where the structure bodies 16, 18 are excited in the X axis direction as described above, a Coriolis force acts on the structure bodies 16, 18. In this case, the detection electrodes 24-1, 24-2, 26-1, 26-2 are oscillated in the Y axis direction due to the Coriolis force, and thus there are changes in capacitances generated between the fixed electrodes and the movable electrodes of the detection electrodes 24-1, 24-2, 26-1, 26-2. When such changes in capacitances are generated, the detection displacement signals output from the detection electrodes 24-1, 24-2, 26-1, 26-2 represent the magnitude of the angular velocity which is related to the amplitudes of the structure bodies 16, 18 in the Y axis direction. The structure bodies 16, 18 are oscillated in opposite phase with respect to the Y axis direction when the Coriolis force acts. Thus, with the sensor 12, it is possible to detect the angular velocity which is generated in an object around the Z axis.

Figure 2:
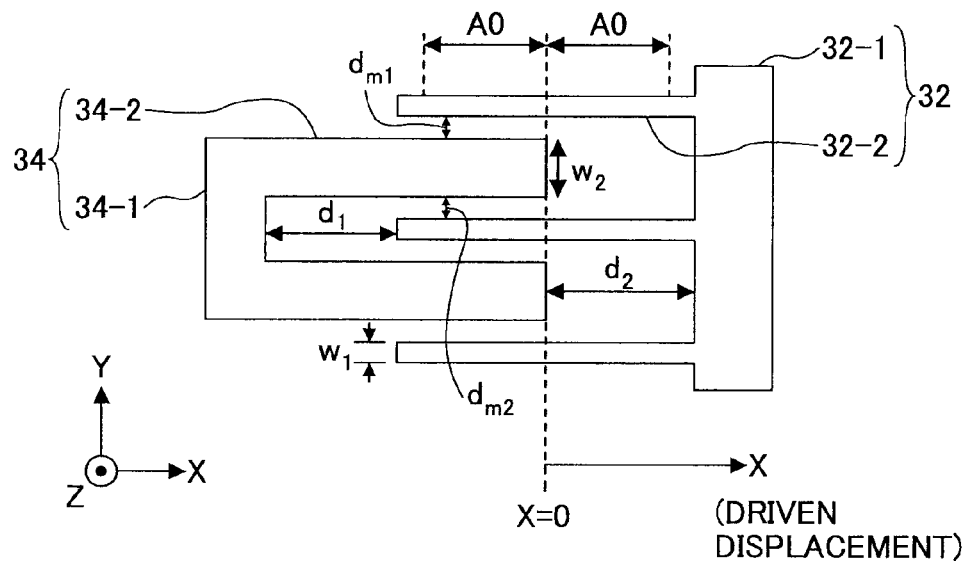
FIG. 2 is a plan view of a displacement amount monitoring electrode according to the embodiment.
Figure 3:
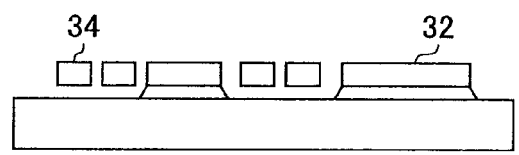
FIG. 3 is a cross sectional view of the displacement amount monitoring electrode according to the embodiment.

FIG. 2 is a plan view of a displacement amount monitoring electrode 10 according to the embodiment. FIG. 3 is a cross sectional view of the displacement amount monitoring electrode 10 according to the embodiment.

The displacement amount monitoring electrode 10 includes a fixed electrode 32 which is fixed with respect to the semiconductor substrate 14; and a movable electrode 34 which movable in the X axis direction with respect to the semiconductor substrate 14. The fixed electrode 32 is connected to a signal processing part via a pad. Further, the movable electrode 34 forms a part of the structure bodies 16, 28. The displacement amount monitoring electrode 10 is provided for detecting the change in the capacitance between the fixed electrode 32 and the movable electrode 34 due to the displacements of the structure bodies 16, 18 in the X axis direction so as to monitor the drive displacement amounts of the structure bodies 16, 18 in the X axis direction with respect to the semiconductor substrate 14.

The fixed electrode 32 and the movable electrode 34 are formed to have comb shapes, and include base portions 32-1, 34-1 having relatively great width and electrode fingers 32-2, 34-2 extending from the base portions 32-1, 34-1 in the X axis direction parallel to the semiconductor substrate 14, respectively. The electrode fingers 32-2, 34-2 are formed to have rectangular cross sectionals, and have equal cross sectional areas (i.e., constant widths w1, w2 in the Y axis direction and constant thickness T1, T2 in the Z axis direction) over a range from the connection portion with the base portions 32-1, 34-1 to the tip portions, respectively. More than two electrode fingers 32-2, 34-2 are provided for the base portions 32-1, 34-1, respectively, and arranged side by side in the Y axis direction with equal spacing. The fixed electrode 32 and the movable electrode 34 are disposed such that the base portions 32-1, 34-1 are opposed in the X axis direction and the electrode fingers 32-2, 34-2 are opposed in the Y axis direction.

The electrode fingers 32-2 of the fixed electrode 32 are formed to have the same width w1 in the Y axis direction, the same thickness T1 in the Z axis direction, and the same length in the X axis direction. The electrode fingers 34-2 of the movable electrode 34 are formed to have the same width w2 in the Y axis direction, the same thickness T2 in the Z axis direction, and the same length in the X axis direction.

If the movable electrode 34 is not moved in the X axis direction, there is a gap d1 in the X axis direction between the tip portions of the electrode finger 32-2 of the fixed electrode 32 and the base portion 34-1 of the movable electrode 34, and there is a gap d2 in the X axis direction between the base portion 32-1 of the fixed electrode 32 and the tip portions of the electrode finger 34-2 of the movable electrode 34.

The electrode fingers 34-2 of the movable electrode 34 are inserted between corresponding two electrode fingers 32-2 of the fixed electrode 32. There is a gap dm in the Y axis direction between the electrode finger 32-2 of the fixed electrode 32 and the electrode finger 34-2 of the movable electrode 34. It is noted that the electrode fingers 34-2 may be disposed at midpoint between the corresponding two electrode fingers 32-2, or may be biased to one of the corresponding two electrode fingers 32-2. If the electrode fingers 34-2 are disposed such that they are biased to one of the corresponding two electrode fingers 32-2, different gaps dm1, dm2 are formed on the opposite sides of the electrode fingers 34-2 in the Y axis direction. On the other hand, if the electrode fingers 34-2 are disposed at midpoint between the corresponding two electrode fingers 32-2, the same gaps dm1, dm2 are formed on the opposite sides of the electrode fingers 34-2 in the Y axis direction.

Further, an overlapped thickness between the electrode fingers 32-2 and the electrode fingers 34-2 in the thickness direction, that is to say, the Z axis direction (i.e., a height of a part of the side wall of the electrode fingers 32-2 which is opposed to the side wall of the electrode fingers 34-2 in the Z axis direction) is Tm. It is noted that the thickness Tm on the side of the gap dm1 (i.e., Tm1) may be different from that on the side of the gap dm2 (i.e., Tm2). However, it is desirable that a relationship T1=T2=Tm (i.e., T1=T2=Tm1=Tm2) is met.

According to the displacement amount monitoring electrode 10 having the construction described above, when the structure bodies 16, 18 are excited in the X axis direction, the movable electrode 34 is displaced in the X axis direction due the excitation of the structure bodies 16, 18. In this case, there is a capacitance change between the fixed electrode 32 and the movable electrode 34 according to the displacement of the movable electrode 34. It is noted that the capacitance changes in the displacement amount monitoring electrodes 28-1, 28-2 are in opposite phase with respect to the capacitance changes in the displacement amount monitoring electrodes 30-1, 30-2. The greater the drive displacement amounts of the structure bodies 16, 18 in the X axis direction are, the greater the capacitance change of the displacement amount monitoring electrode 10 becomes.

The fixed electrode of the displacement amount monitoring electrode 10 outputs the capacitance change between the fixed electrode 32 and the movable electrode 34 as a drive displacement amount monitor signal to the signal processing circuit. The signal processing circuit processes the drive displacement amount monitor signal from the displacement amount monitoring electrode 10 to monitor the drive displacement amounts of the structure bodies 16, 18 in the X axis direction. The drive voltages applied to the drive electrodes 20-1, 20-2 are controlled based on the drive displacement amounts such that the structure bodies 16, 18 are excited with constant amplitudes in the X axis direction.

In order to make the sensor 12 detect the angular velocity around the Z axis with high accuracy, it is necessary that the amplitudes of the structure bodies 16, 18 as detection masses excited in the X axis direction are always constant. In order to keep the driven amplitudes of the structure bodies 16, 18 in the X axis direction constant, it is general to maintain the capacitance change amount between the fixed electrode 32 and the movable electrode 34 of the displacement amount monitoring electrode 10. Thus, it is appropriate to control the drive voltages applied to the drive electrodes 20-1, 20-2 such that the capacitance change amount is kept constant. Specifically, it is appropriate that the control is performed assuming that the drive displacement amounts of the structure bodies 16, 18 reach target displacement amounts (target amplitudes) when the capacitance change amount reaches a target capacitance change amount.

Figure 4:
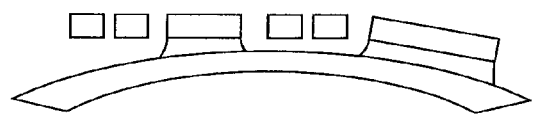
FIG. 4 is a cross sectional view of the displacement amount monitoring electrode when it is deformed because of a change in stress.
Figure 5:
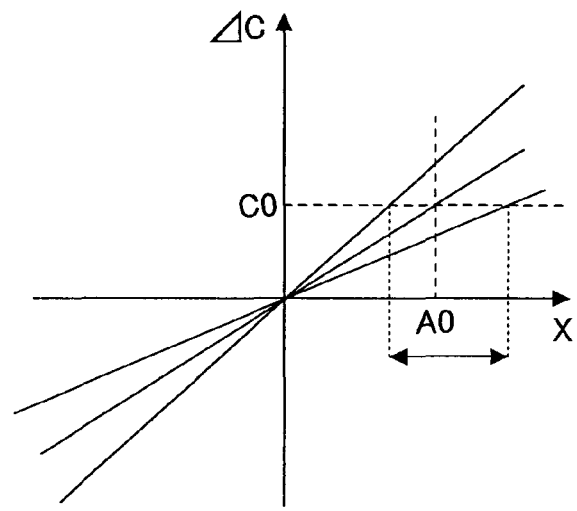
FIG. 5 is a diagram for illustrating a relationship between a drive displacement amount x of a movable electrode and a capacitance change amount ΔC between a fixed electrode and the movable electrode, which relationship changes due to variations in dimensions of the displacement amount monitoring electrode.

FIG. 4 is a cross sectional view of the displacement amount monitoring electrode 10 when it is deformed because of a change in stress. FIG. 5 is a diagram for illustrating a relationship (gradient) between the drive displacement amount x of the structure bodies 16, 18, that is to say, the movable electrode 34 and the capacitance change amount ΔC between the fixed electrode 32 and the movable electrode 34, which relationship changes due to variations in stress or dimensions of the displacement amount monitoring electrode 10. "0" of the drive displacement amount x corresponds to the positions of the tips of the electrode fingers 34-2 in a case where the movable electrode 34 is not moved in the X axis direction. A side in which the tips of the electrode fingers 34-2 are close to the base portion 32-1 of the fixed electrode 32 corresponds to x>0, and a side in which the tips of the electrode fingers 34-2 are away from the base portion 32-1 of the fixed electrode 32 corresponds to x<0.

However, the capacitance change amount ΔC between the fixed electrode 32 and the movable electrode 34 changes due to not only the drive displacement amount x of the structure bodies 16, 18 but also a gap and a opposed area between the fixed electrode 32 and the movable electrode 34. In other words, the relationship between the drive displacement amount x and the capacitance change amount ΔC changes according to the gap and the opposed area.

The electrode fingers 34-2 are inserted between corresponding two of the electrode fingers 32-2; however, if the inserted amount is not so great, the capacitance change between the fixed electrode 32 and the movable electrode 34 is generated only between the electrode fingers 32-2 and the electrode fingers 34-2. In this case, the capacitance change amount ΔC between the fixed electrode 32 and the movable electrode 34 changes linearly with respect to the drive displacement amount x of the movable electrode 34 (linear change region). On the other hand, if the inserted amount of the electrode fingers 34-2 of the movable electrode 34 between corresponding two of the electrode fingers 32-2 of the fixed electrode 32 becomes greater, the capacitance change between the fixed electrode 32 and the movable electrode 34 is generated not only between the electrode fingers 32-2 and the electrode fingers 34-2 but also between the base portion 32-1 and the tips of the electrode fingers 34-2 and between the tips of the electrode fingers 32-2 and the base portion 34-1. In this case, the capacitance change amount ΔC between the fixed electrode 32 and the movable electrode 34 changes nonlinearly with respect to the drive displacement amount x of the movable electrode 34 (nonlinear change region).

As illustrated in FIG. 5, in the case of a configuration in which a target capacitance change amount C0 between the fixed electrode 32 and the movable electrode 34 at a point where the movable electrode 34 reaches a target displacement amount A0 corresponding to the target amplitudes of the structure bodies 16, 18 is set in the linear change area, if the gap and the opposed area between the fixed electrode 32 and the movable electrode 34 greatly deviate from desired ones due to the stress change or dimensional variation of the displacement amount monitoring electrode 10, the drive displacement amount x of the movable electrode 34 greatly deviates from the target displacement amount A0 when the capacitance change amount ΔC reaches target capacitance change amount C0, which makes it difficult to keep the amplitudes of the structure bodies 16, 18 constant.

Figure 6:
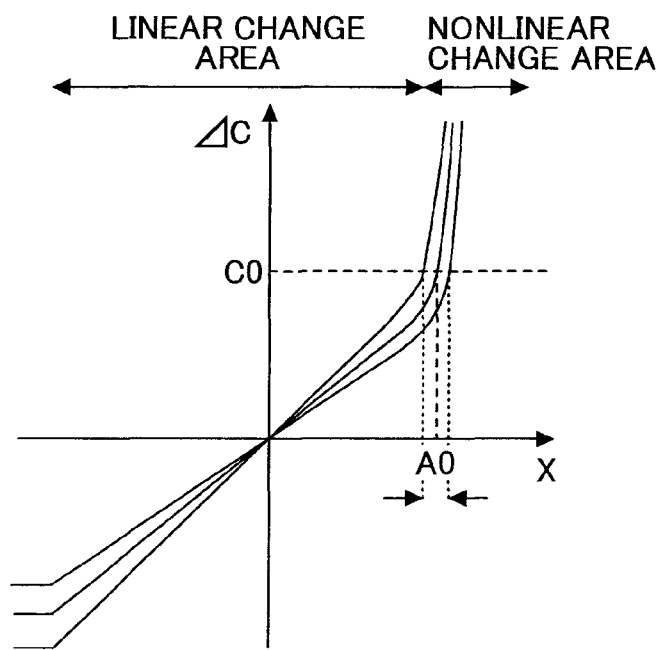
FIG. 6 is a diagram for illustrating a relationship between a drive displacement amount x of a movable electrode and a capacitance change amount ΔC between a fixed electrode and the movable electrode in the displacement amount monitoring electrode according to the embodiment.

FIG. 6 is a diagram for illustrating a relationship between the drive displacement amount x of the structure bodies 16, 18, that is to say, the movable electrode 34 and the capacitance change amount ΔC between the fixed electrode 32 and the movable electrode 34 according to the displacement amount monitoring electrode 10 of the embodiment.

The capacitance change amount ΔC between the fixed electrode 32 and the movable electrode 34 is calculated according to the following formula (1). ∈ indicates relative dielectric constant between the fixed electrode 32 and the movable electrode 34, and N indicates the number of the opposed electrodes of the displacement amount monitoring electrode 10 (specifically, the number of the electrode fingers 34-2 of the movable electrode 34). It is noted that in the right-hand side of the formula (1) the first and second terms represent the linear change area, and the third and fourth terms represent the nonlinear change region.

$$\Delta C = \frac{\varepsilon \cdot T_{m1} \cdot N}{d_{m1}} \cdot x + \frac{\varepsilon \cdot T_{m2} \cdot N}{d_{m2}} \cdot x + \frac{\varepsilon \cdot w_1 \cdot T_1 \cdot N}{d_1(d_1 - x)} \cdot x + \frac{\varepsilon \cdot w_2 \cdot T_2 \cdot N}{d_2(d_2 - x)} \cdot x \quad (1)$$

In the embodiment, the displacement amount monitoring electrode 10 is configured such that the following criteria are met. In the course of the driven displacement of the movable electrode 34 with the target displacement amount A0 corresponding to the target amplitudes of the structure bodies 16, 18, the relationship between the drive displacement amount x of the movable electrode 34 and the capacitance change amount ΔC between the fixed electrode 32 and the movable electrode 34 includes the linear change area in which the capacitance change amount ΔC changes linearly with the driven displacement of the movable electrode 34 and the nonlinear change region in which the capacitance change amount ΔC changes nonlinearly. Further, a change sensitivity (gradient) of the capacitance change amount ΔC with respect to the drive displacement amount x of the movable electrode 34 in the nonlinear change region includes a characteristic of a change sensitivity which is greater than that of the linear change region. Further, the target capacitance change amount C0 between the fixed electrode 32 and the movable electrode 34 at the point of the movable electrode 34 reaching the target displacement amount A0 is set in the nonlinear change region in which the change sensitivity is higher than that of the linear change region.

Specifically, the construction of the displacement amount monitoring electrode 10 is configured to have such dimensions that meet the following criterion indicated by a formula (2). However, if the thickness T1 of the electrode fingers 32-2 of the fixed electrode 32 and the thickness T2 of the electrode fingers 34-2 of the movable electrode 34 are constant regardless of the locations, and the thickness Tm1, Tm2 of the portions of the electrode fingers 32-2, 34-2 overlapped in the Z axis direction correspond to T1, T2, respectively, the relationship T1=T2=Tm1=Tm2 is established, and thus the dimensions that meet following formula (3) may be set.

$$\frac{T_{m1}}{d_{m1}} + \frac{T_{m2}}{d_{m2}} \le \frac{w_1 \cdot T_1}{d_1(d_1 - A_0)} + \frac{w_2 \cdot T_2}{d_2(d_2 - A_0)} \quad (2)$$

$$\frac{1}{d_{m1}} + \frac{1}{d_{m2}} \le \frac{w_1}{d_1(d_1 - A_0)} + \frac{w_2}{d_2(d_2 - A_0)} \quad (3)$$

According to such a configuration of the displacement amount monitoring electrode 10, the change sensitivity of the capacitance change amount ΔC with respect to the drive displacement amount x of the movable electrode 34 when the movable electrode reaches near the target displacement amount A0 becomes higher with respect to a configuration in which the target capacitance change amount C0 is set in the linear change area. Further, if the tips of the electrode fingers 34-2 of the movable electrode 34 are further displaced to be closer to the base portion 32-1 of the fixed electrode 32 after the movable electrode has reached the target displacement amount A0, the change sensitivity of the capacitance change amount ΔC with respect to the drive displacement amount x of the movable electrode 34 increases with the displacement. Therefore, even if the gap and the opposed area between the fixed electrode 32 and the movable electrode 34 change due to the stress change or dimensional variation of the displacement amount monitoring electrode 10, the variation in the drive displacement amount x of the movable electrode 34 at the time when the capacitance change amount ΔC between the fixed electrode 32 and the movable electrode 34 reaches the target capacitance change amount C0 is reduced.

Thus, according to the configuration of the displacement amount monitoring electrode 10 of the embodiment, it is possible to prevent the drive displacement amount x of the movable electrode 34 at the time when the capacitance change amount ΔC between the fixed electrode 32 and the movable electrode 34 reaches the target capacitance change amount C0 from greatly deviating from the target displacement amount A0. Therefore, even if the relationship between the fixed electrode 32 and the movable electrode 34 changes, it is possible to keep the amplitudes of the structure bodies 16, 18 at constant target amplitudes as much as possible. Further, robustness for disturbance factors such as a stress generated at the time of assembling, a temperature change and manufacturing factors such as dimensional variations is improved, which enhances yield and efficiency percentage.

It is noted that in the first embodiment described above the structure bodies 16, 18 correspond to "detection mass" in claims, the X axis direction corresponds to "predetermined axis direction" in claims, the Y axis direction corresponds to "a direction perpendicular to a predetermined axis direction" in claims, w1*T1 corresponds to "an area of portions of the electrode fingers of the fixed electrode which face the base portion of the movable electrode" and "S1", and w2*T2 corresponds to "an area of portions of the electrode fingers of the movable electrode which face the base portion of the fixed electrode" and "S2".

Figure 7:
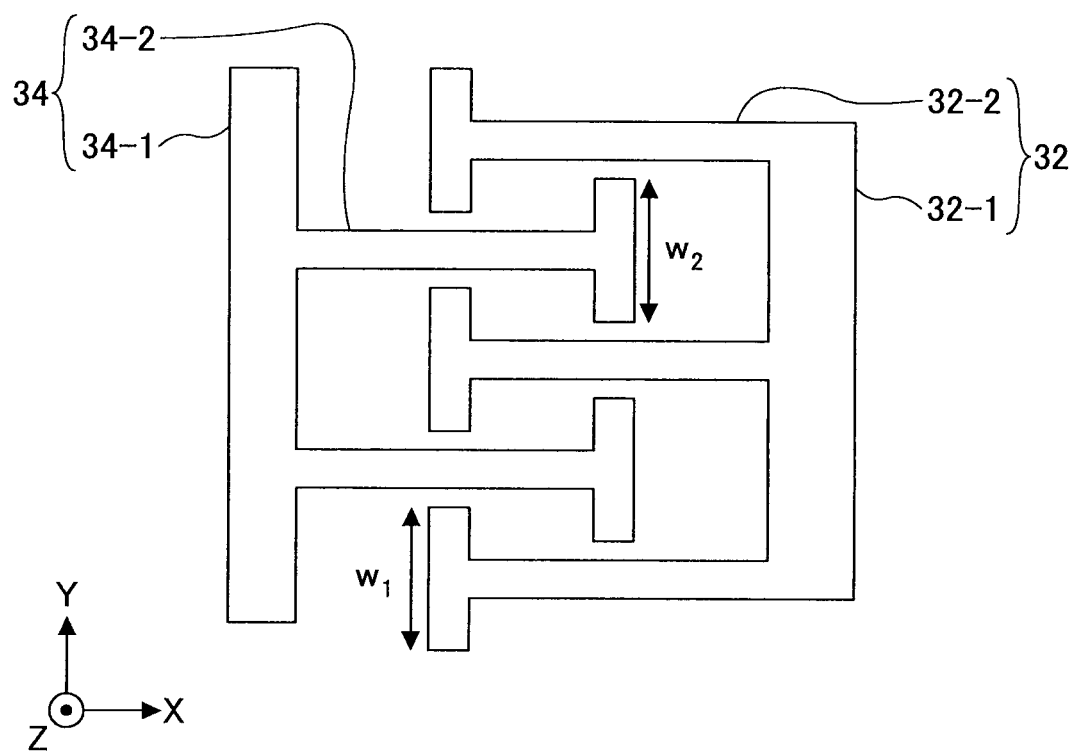
FIG. 7 is a plan view of a displacement amount monitoring electrode according to a variant.
Figure 8:
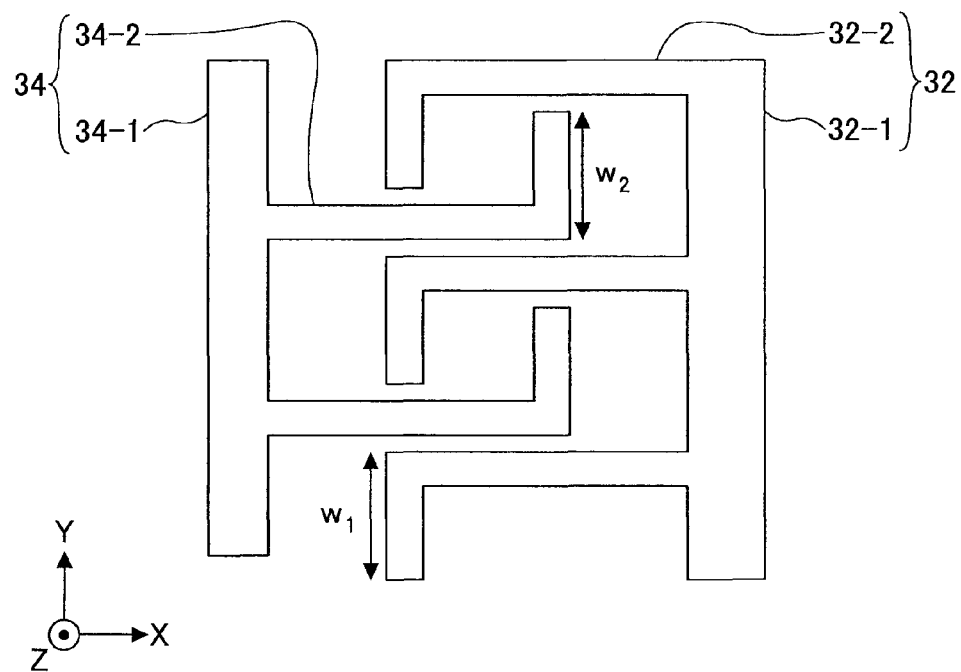
FIG. 8 is a plan view of a displacement amount monitoring electrode according to a variant.

In the first embodiment described above, the electrode fingers 32-2, 34-2 are formed to have rectangular cross sectionals, and have equal cross sectional areas over a range from the connection portion with the base portions 32-1, 34-1 to the tip portions, respectively; however, the present invention is not limited to this configuration. For example, the electrode fingers 32-2, 34-2 may be T-shaped when viewed in the Z axis direction as illustrated in FIG. 7 or L-shaped when viewed in the Z axis direction as illustrated in FIG. 8. In other words, the widths w1, w2 of the tip portions of the electrode fingers 32-2, 34-2 of the fixed electrode 32 and the movable electrode 34 in the Y axis direction may be greater than those of other portions in the Y axis direction. In this case, at least one of the widths w1, w2 of the tip portions of the electrode fingers 32-2, 34-2 may be increased.

According to such a configuration of the variant, areas of the tip portions of the electrode fingers 32-2, 34-2 of the fixed electrode 32 and the movable electrode 34 facing to the base portions 34-1, 32-1 of the movable electrode 34 and the fixed electrode 32 can be increased. Thus, the criteria indicated by the formulas (2) and (3) can be easily met, and the change sensitivity of the capacitance change amount ΔC with respect to the drive displacement amount x of the movable electrode 34 in the nonlinear change region can be increased.

Figure 9:
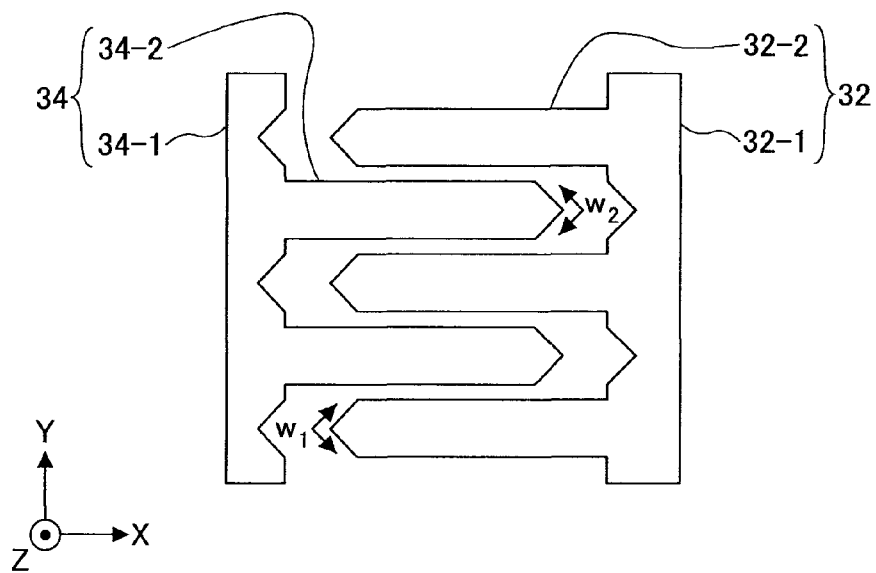
FIG. 9 is a plan view of a displacement amount monitoring electrode according to a variant.
Figure 10:
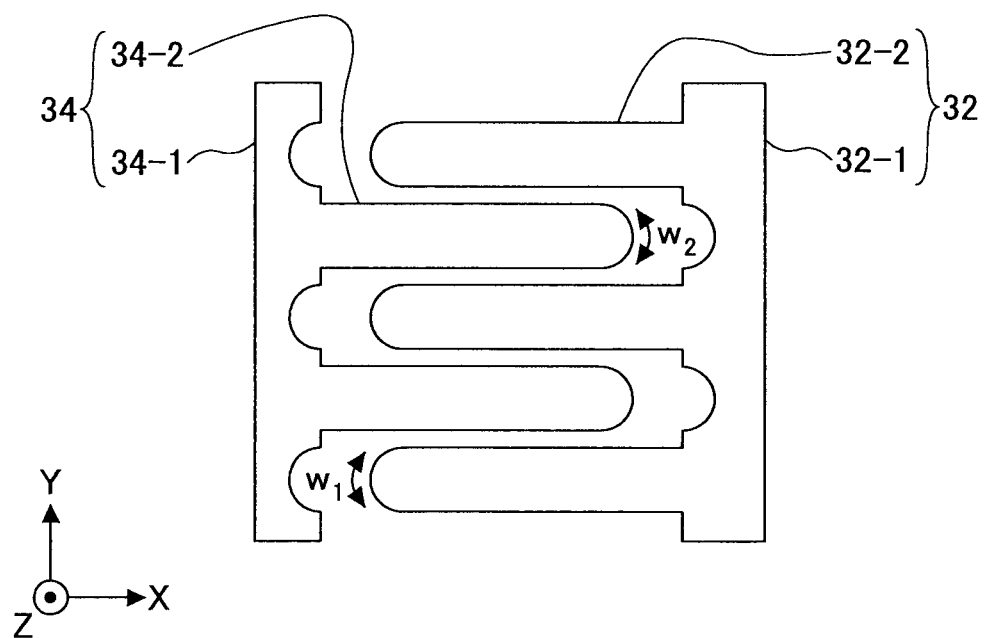
FIG. 10 is a plan view of a displacement amount monitoring electrode according to a variant.

Further, instead of the variant described above, the electrode fingers 32-2, 34-2 may be formed like a bar when viewed in the Z axis direction and have constant cross sectional areas over a range from the connection portion with the base portions 32-1, 34-1 to points near the tip portions, and the shapes of the tip portions of the electrode fingers 32-2, 34-2 and the shapes of the base portions 32-1, 34-1 opposed to the tip portions may be inclined as illustrated in FIG. 9 or rounded as illustrated in FIG. 10.

In other words, the areas of the tip portions of the electrode fingers 32-2, 34-2 facing to the base portions 34-1, 32-1 (i.e., the whole length in the X-Y plane along which both face to each other) may be made greater than the cross sectional areas of other portions of the electrode fingers 32-2, 34-2 (i.e., the width in the Y axis direction). In this case, at least one of the opposed area of the tip portions of the electrode fingers 32-2 and the base portions 34-1 and the opposed area of the tip portions of the electrode fingers 34-2 and the base portions 32-1 may be made greater. Further, although the shapes of the tip portions of the electrode fingers 32-2, 34-2 are convex and the shapes of base portions 34-1, 32-1 are concave, as illustrated in FIG. 9, the shapes of the tip portions of the electrode fingers 32-2, 34-2 may be concave and the shapes of base portions 34-1, 32-1 may be convex.

According to such a configuration of the variant, areas of the tip portions of the electrode fingers 32-2, 34-2 of the fixed electrode 32 and the movable electrode 34 facing to the base portions 34-1, 32-1 of the movable electrode 34 and the fixed electrode 32 can be increased. Thus, the criteria indicated by the formulas (2) and (3) can be easily met, and the change sensitivity of the capacitance change amount $\Delta C$ with respect to the drive displacement amount x of the movable electrode 34 in the nonlinear change region can be increased. Further, it becomes possible to prevent the gap distance dm between the electrode fingers 32-2, 34-2 of the fixed electrode 32 and the movable electrode 34 in the Y axis direction from becoming greater, and thus it becomes possible to prevent an area occupied by the displacement amount monitoring electrode 10 in the semiconductor substrate 14 from increasing.

Figure 11:
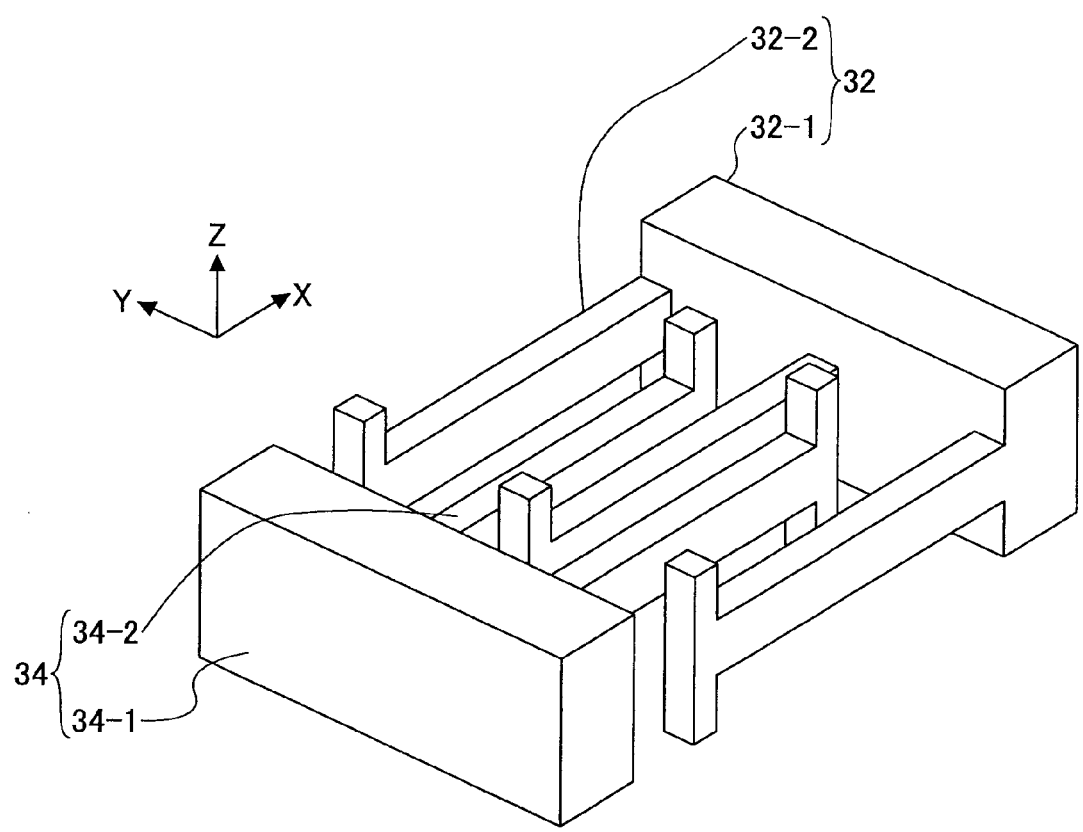
FIG. 11 is a perspective view of a displacement amount monitoring electrode according to a variant.
Figure 12A:
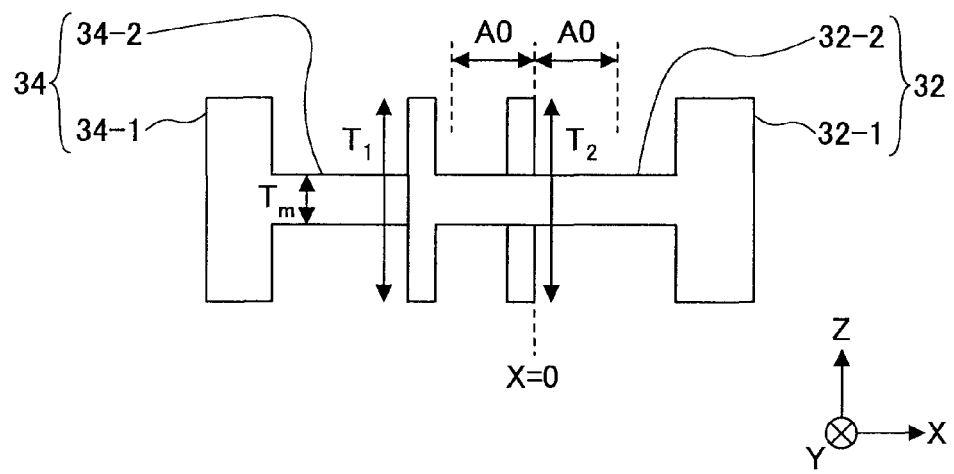
FIG. 12A is a side view of the displacement amount monitoring electrode illustrated in FIG. 11.
Figure 12B:
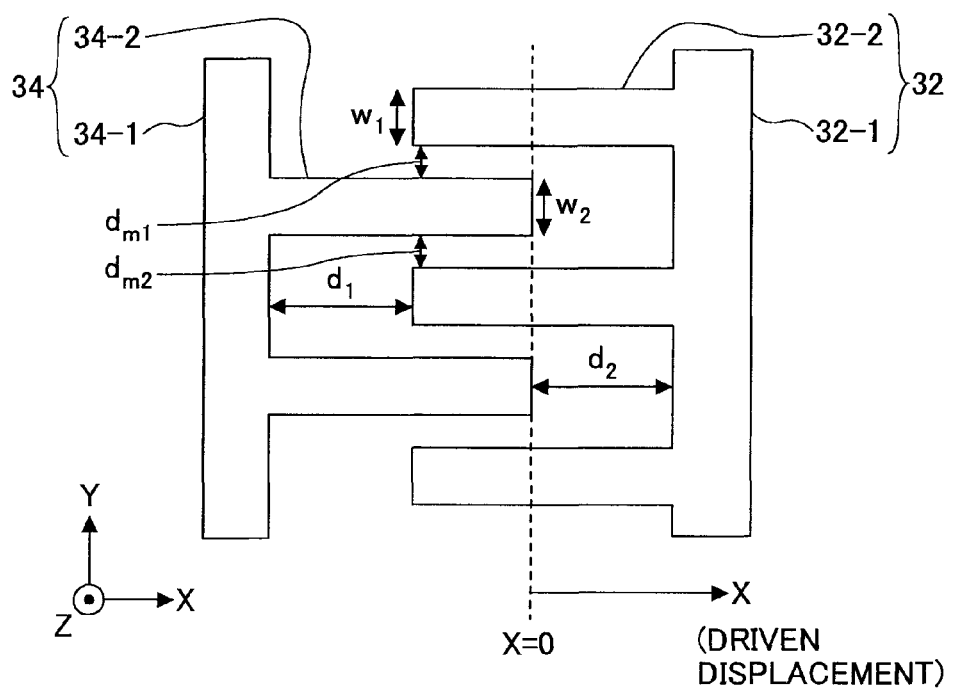
FIG. 12B is a plan view of the displacement amount monitoring electrode illustrated in FIG. 11.
Figure 13:
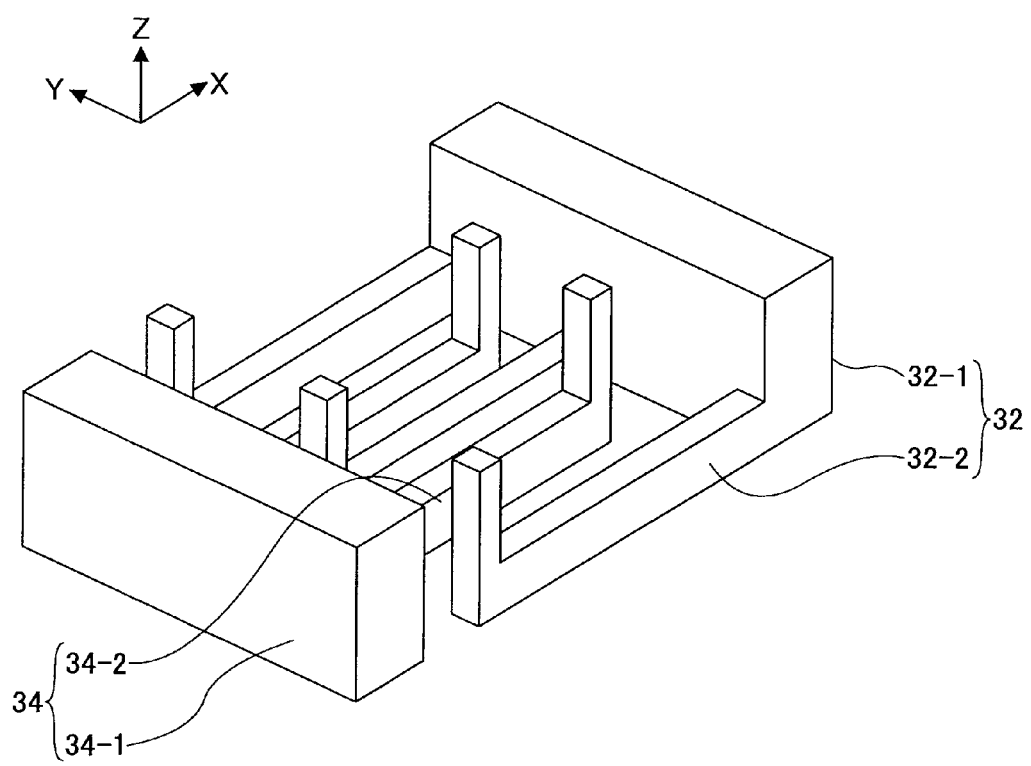
FIG. 13 is a perspective view of a displacement amount monitoring electrode according to a variant.
Figure 14A:
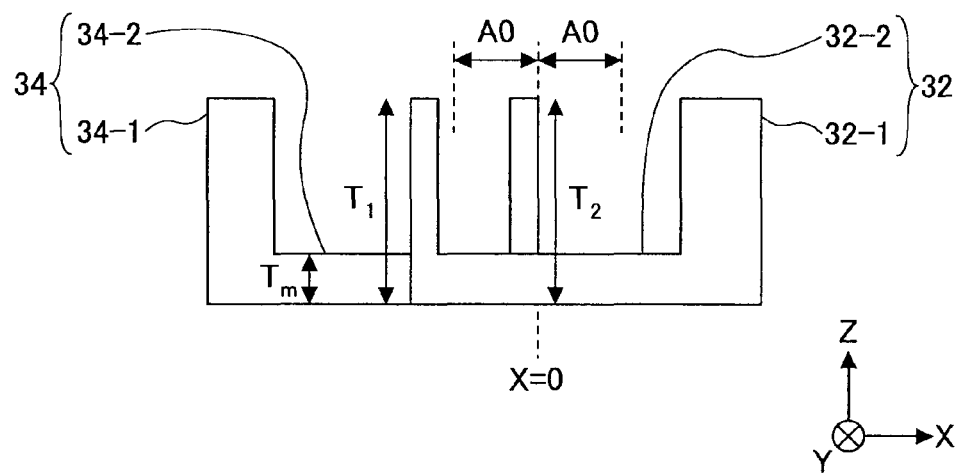
FIG. 14A is a side view of the displacement amount monitoring electrode illustrated in FIG. 13.
Figure 14B:
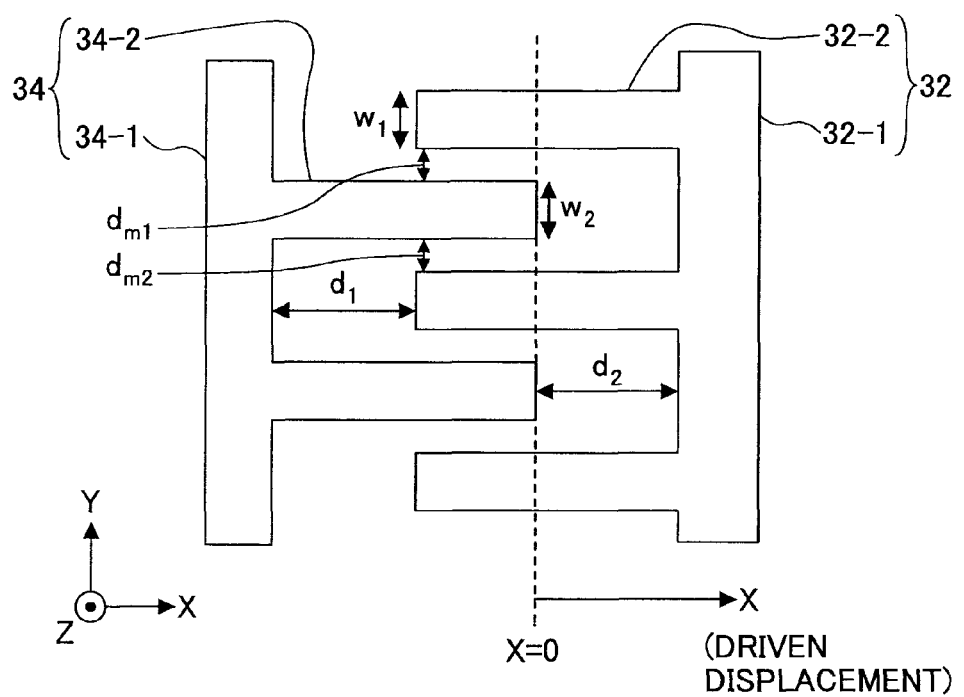
FIG. 14B is a plan view of the displacement amount monitoring electrode illustrated in FIG. 13.

Further, in the first embodiment described above, the thickness T1 of the electrode fingers 32-2 of the fixed electrode 32 in the Z axis direction and the thickness T2 of the electrode fingers 34-2 of the movable electrode 34 in the Z axis direction are constant from the connection portions with the base portions 32-1, 34-1 and the tip portions; however, the present invention is not limited to this configuration. For example, the electrode fingers 32-2, 34-2 of the fixed electrode 32 and the movable electrode 34 may be T-shaped when viewed in the Y axis direction as illustrated in FIG. 11, FIG. 12A and FIG. 12B or L-shaped when viewed in the Y axis direction as illustrated in FIG. 13, FIG. 14A and FIG. 14B. In other words, the thicknesses T1, T2 of the tip portions of the electrode fingers 32-2, 34-2 of the fixed electrode 32 and the movable electrode 34 in the Z axis direction may be greater than those of other portions in the Z axis direction, or the overlapped thickness Tm (i.e., Tm1 and Tm2) between the electrode fingers 32-2, 34-2 of the fixed electrode 32 and the movable electrode 34 in the Z axis direction may be decreased. In this case, at least one of the thicknesses T1, T2 of the tip portions may be increased.

According to such a configuration of the variant, areas of the tip portions of the electrode fingers 32-2, 34-2 of the fixed electrode 32 and the movable electrode 34 facing the base portions 34-1, 32-1 of the movable electrode 34 and the fixed electrode 32 can be increased. Thus, the criteria indicated by the formulas (2) and (3) can be easily met, and the change sensitivity of the capacitance change amount $\Delta C$ with respect to the drive displacement amount x of the movable electrode 34 in the nonlinear change region can be increased. Further, since the opposed areas between the electrode fingers 32-2, 34-2 of the fixed electrode 32 and the movable electrode 34 can be decreased, the change sensitivity of the capacitance change amount $\Delta C$ with respect to the drive displacement amount x of the movable electrode 34 in the linear change region can be decreased. Therefore, the variation in the drive displacement amount x of the movable electrode 34 at the time when the capacitance change amount $\Delta C$ between the fixed electrode 32 and the movable electrode 34 reaches the target capacitance change amount C0 can be reduced, and thus the robustness for disturbance factors such as a stress generated at the time of assembling, a temperature change and manufacturing factors such as dimensional variations is improved.

Figure 15:
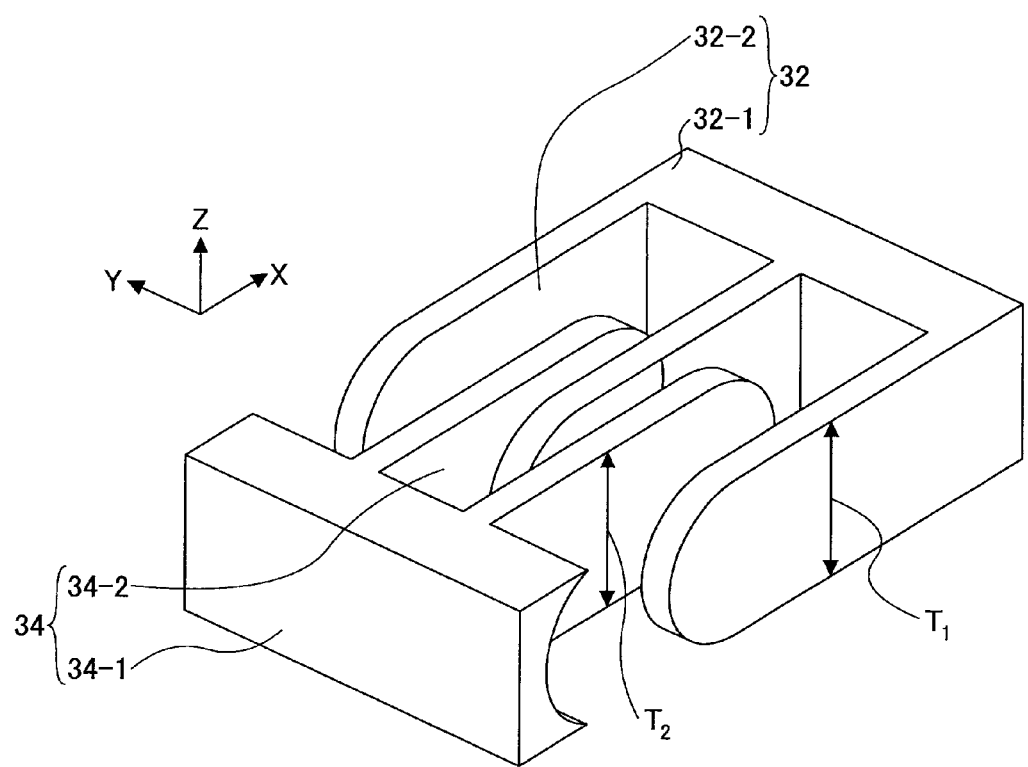
FIG. 15 is a perspective view of a displacement amount monitoring electrode according to a variant.
Figure 16:
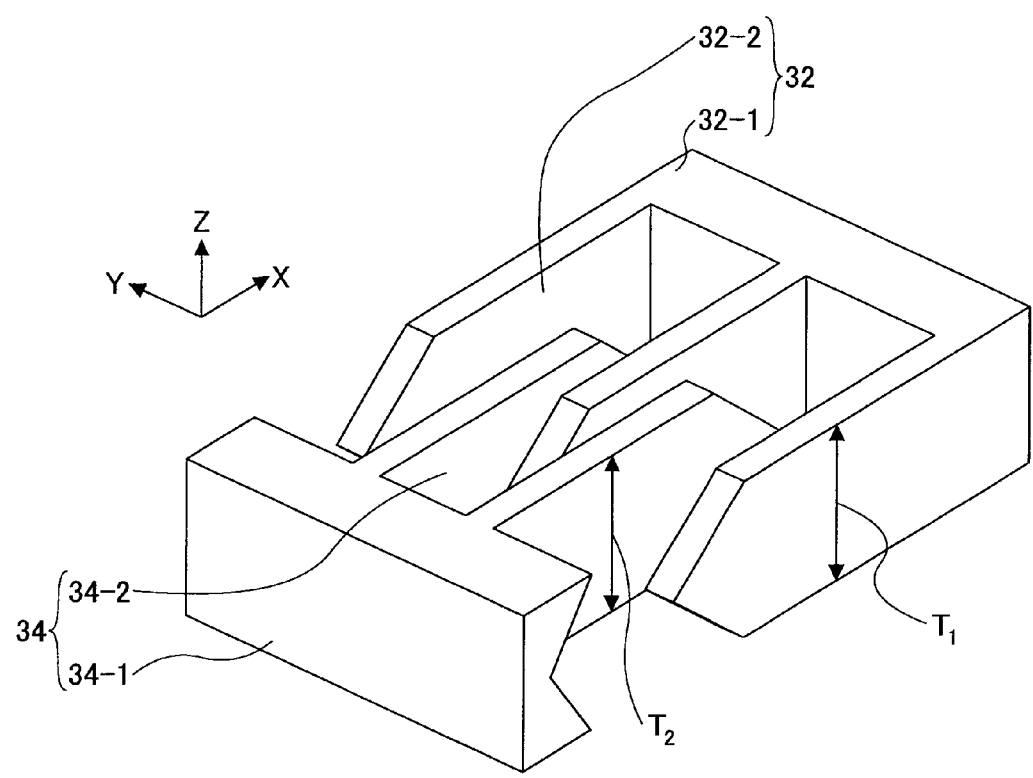
FIG. 16 is a perspective view of a displacement amount monitoring electrode according to a variant.

Further, instead of the variant described above, the electrode fingers 32-2, 34-2 may be formed like a bar when viewed in the Y axis direction and have constant cross sectional areas over a range from the connection portion with the base portions 32-1, 34-1 to points near the tip portions, and the shapes of the tip portions of the electrode fingers 32-2, 34-2 and the shapes of the base portions 32-1, 34-1 opposed to the tip portions may be rounded as illustrated in FIG. 15 or inclined as illustrated in FIG. 16.

In other words, the areas of the tip portions of the electrode fingers 32-2, 34-2 facing to the base portions 34-1, 32-1 (i.e., the whole length in the X-Z plane along which both face to each other) may be made greater than the cross sectional areas of other portions of the electrode fingers 32-2, 34-2 (i.e., the width in the Z axis direction). In this case, at least one of the opposed area of the tip portions of the electrode fingers 32-2 and the base portions 34-1 and the opposed area of the tip portions of the electrode fingers 34-2 and the base portions 32-1 may be made greater. Further, although the shapes of the tip portions of the electrode fingers 32-2, 34-2 are convex and the shapes of base portions 34-1, 32-1 are concave, as illustrated in FIG. 15 and FIG. 16, the shapes of the tip portions of the electrode fingers 32-2, 34-2 may be concave and the shapes of base portions 34-1, 32-1 may be convex.

According to such a configuration of the variant, areas of the tip portions of the electrode fingers 32-2, 34-2 of the fixed electrode 32 and the movable electrode 34 facing to the base portions 34-1, 32-1 of the movable electrode 34 and the fixed electrode 32 can be increased. Thus, the criteria indicated by the formulas (2) and (3) can be easily met, and the change sensitivity of the capacitance change amount $\Delta C$ with respect to the drive displacement amount x of the movable electrode 34 in the nonlinear change region can be increased. Further, it becomes possible to prevent the maximum thicknesses of the fixed electrode 32 and the movable electrode 34 in the Z axis direction from becoming greater, and thus it becomes possible to prevent a volume occupied by the displacement amount monitoring electrode 10 in the semiconductor substrate 14 from increasing.

Figure 17:
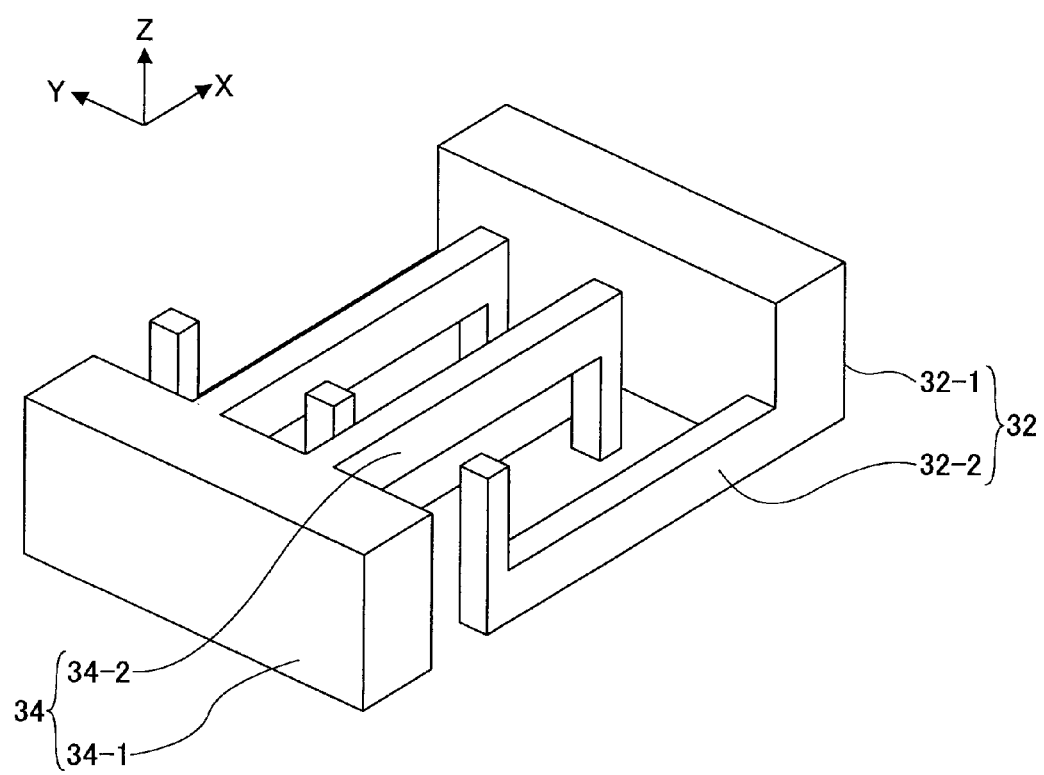
FIG. 17 is a perspective view of a displacement amount monitoring electrode according to a variant.
Figure 18A:
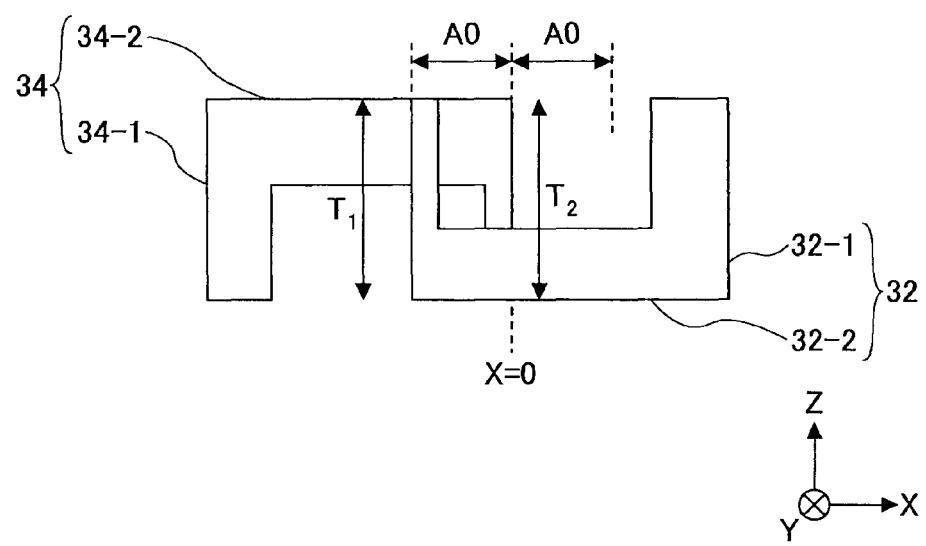
FIG. 18A is a side view of the displacement amount monitoring electrode illustrated in FIG. 17.
Figure 18B:
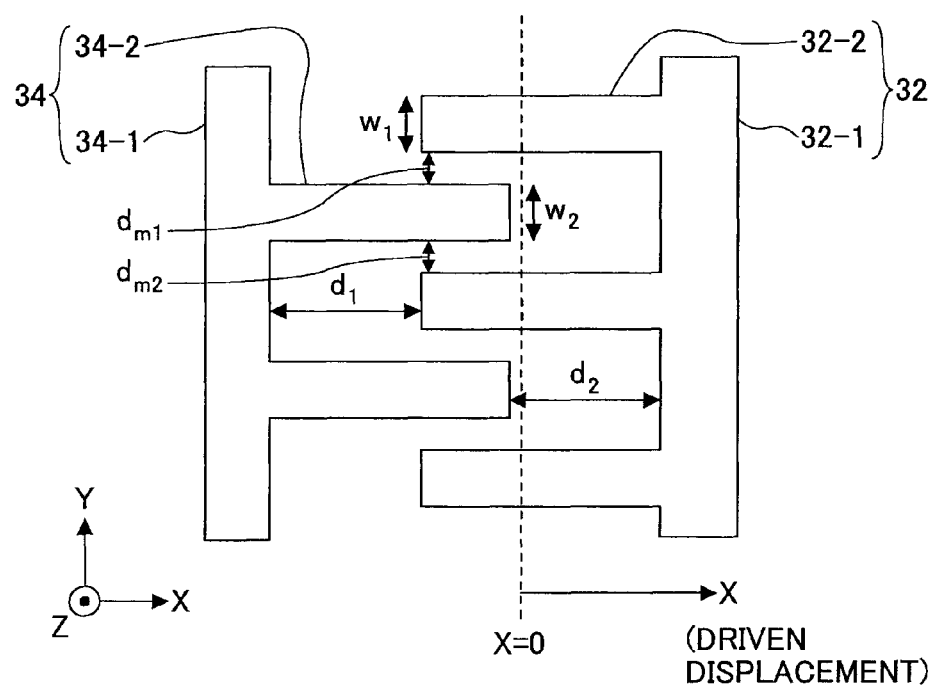
FIG. 18B is a plan view of the displacement amount monitoring electrode illustrated in FIG. 17.

Further, in the embodiment described above, the overlapped thickness Tm (i.e., Tm1 and Tm2) between the electrode fingers 32-2, 34-2 of the fixed electrode 32 and the movable electrode 34 in the Z axis direction correspond to the thicknesses T1, T2 of the electrode fingers 32-2, 34-2 in the Z axis direction; however, the present invention is not limited to this configuration. For example, the thickness Tm (i.e., Tm1 and Tm2) may be less than the thicknesses T1, T2. Further, as illustrated in FIG. 17, FIG. 18A and FIG. 18B, the electrode fingers 32-2, 34-2 may be arranged such that portions other than the tip portions are not overlapped. It is noted that this variant may be applied to the first embodiment and the variants described above.

According to the configuration of the variant, since the change sensitivity of the capacitance change amount ΔC with respect to the drive displacement amount x of the movable electrode 34 in the linear change region can be made less, and the variation of the capacitance change amount ΔC with respect to the drive displacement amount of the movable electrode 34 is reduced, the variation in the drive displacement amount x of the movable electrode 34 at the time when the capacitance change amount ΔC reaches the target capacitance change amount C0 can be reduced. Further, robustness for disturbance factors such as a stress generated at the time of assembling, a temperature change and manufacturing factors such as dimensional variations is improved, which enhances yield and efficiency percentage.

Figure 19:
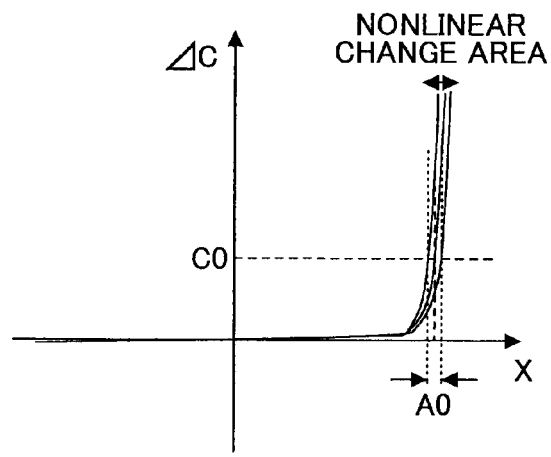
FIG. 19 is a diagram for illustrating a relationship between a drive displacement amount x of a movable electrode and a capacitance change amount ΔC between a fixed electrode and a movable electrode in the displacement amount monitoring electrode illustrated in FIG. 17.

In particular, according to the configuration in which the fixed electrode 32 and the movable electrode 34 are arranged such that the electrode fingers 32-2, 34-2 are not opposed to each other in the Y axis direction perpendicular to the X axis direction (i.e., the electrode fingers 32-2, 34-2 are arranged such that the portions other than the tip portions are not overlapped), the change sensitivity of the capacitance change amount ΔC with respect to the drive displacement amount x of the movable electrode 34 in the linear change region can be substantially zero, as illustrated in FIG. 19, and thus the effects described above can be obtained. It is noted that if the electrode fingers 32-2, 34-2 are arranged such that the portions other than the tip portions are not overlapped, the construction of the displacement amount monitoring electrode 10 may be set to the dimensions which meet a criterion indicated by the following formula (4).

$$0 \leq \frac{w_1 \cdot T_1}{d_1(d_1 - A_0)} + \frac{w_2 \cdot T_2}{d_2(d_2 - A_0)} \quad (4)$$

Second Embodiment

Figure 20:
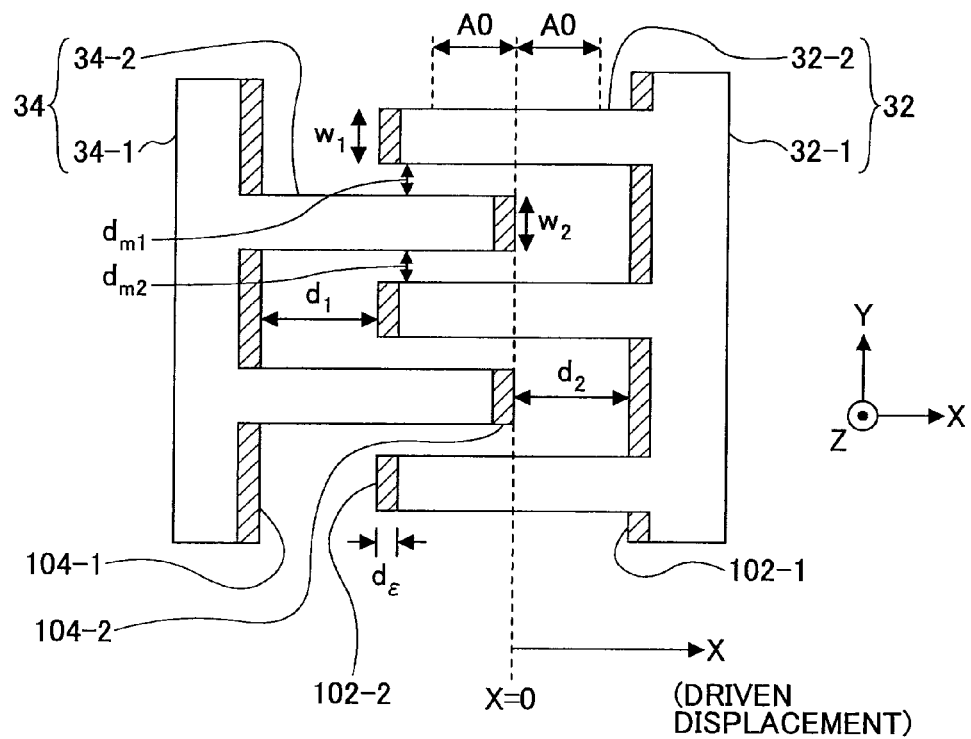
FIG. 20 is a plan view of a displacement amount monitoring electrode according to a second embodiment.
Figure 21:
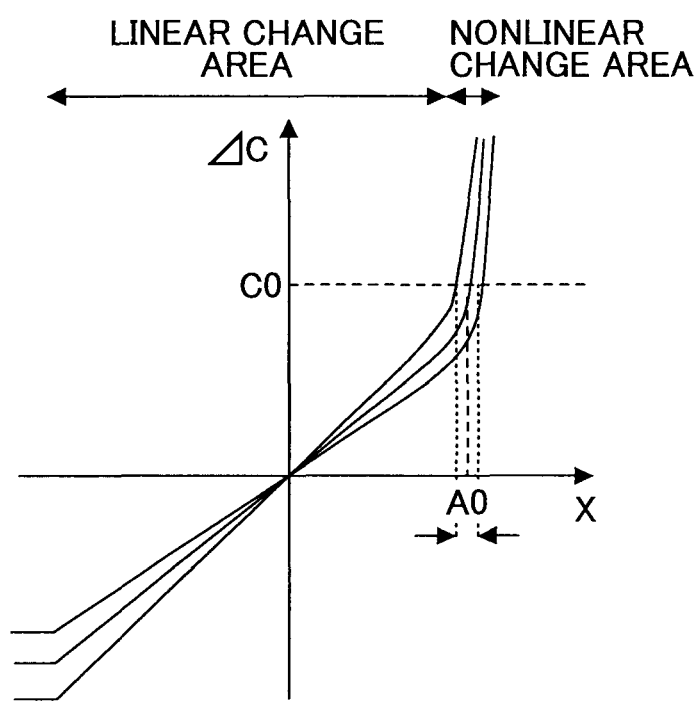
FIG. 21 is a diagram for illustrating a relationship between a drive displacement amount x of a movable electrode and a capacitance change amount ΔC between a fixed electrode and the movable electrode in the displacement amount monitoring electrode according to the embodiment.

FIG. 20 is a plan view of a displacement amount monitoring electrode 100 according to the second embodiment of the present invention. It is noted that elements of the configuration which are the same as those of the configuration illustrated in FIG. 2 are given the same reference numerals and the explanation thereof is omitted or simplified. Further, FIG. 21 is a diagram for illustrating a relationship between the drive displacement amount x of the structure bodies 16, 18, that is to say, the movable electrode 34 and the capacitance change amount ΔC between the fixed electrode 32 and the movable electrode 34 according to the displacement amount monitoring electrode 100 of the embodiment.

The displacement amount monitoring electrode 100 of the embodiment includes the fixed electrode 32 and the movable electrode 34. The fixed electrode 32 and the movable electrode 34 are formed to have comb shapes, and include base portions 32-1, 34-1 having relatively great width and electrode fingers 32-2, 34-2 extending from the base portions 32-1, 34-1 in the X axis direction parallel to the semiconductor substrate 14, respectively. The electrode fingers 32-2, 34-2 are formed to have rectangular cross sectionals, and have equal cross sectional areas (i.e., constant widths w1, w2 in the Y axis direction and constant thickness T1, T2 in the Z axis direction) over a range from the connection portion with the base portions 32-1, 34-1 to the tip portions, respectively.

In the fixed electrode 32, a dielectric material 102-1 is provided on a surface of the base portion 32-1 opposed to the tip portions of the electrode fingers 34-2 of the movable electrode 34 in the X axis direction, and a dielectric material 102-2 is provided on surfaces of the tip portions of the electrode fingers 32-2. Further, in the movable electrode 34, a dielectric material 104-1 is provided on a surface of the base portion 34-1 opposed to the tip portions of the electrode fingers 32-2 of the fixed electrode 32 in the X axis direction, and a dielectric material 104-2 is provided on surfaces of the tip portions of the electrode fingers 34-2.

The dielectric materials 102-1, 102-2, 104-1, 104-2 include materials with high insulation characteristics, low modulus of elasticity or viscosity. The dielectric materials 102-1, 102-2, 104-1, 104-2 may be manufactured using a SiO$_2$ film (oxidized insulating film), which can be easily formed by thermal oxidation of silicon, for example, organic materials such as resist materials, etc. It is noted that the dielectric materials 102-1, 102-2, 104-1, 104-2 have a relative dielectric constant ∈r, which is higher than a relative dielectric constant of "1" of air (strictly speaking, a vacuum), and a predetermined thickness d∈ in the X axis direction.

If the movable electrode 34 is not moved in the X axis direction, there is a gap d1 in the X axis direction between the dielectric material 102-2 provided on the tip portions of the electrode finger 32-2 of the fixed electrode 32 and the dielectric material 104-1 provided on the base portion 34-1 of the movable electrode 34, and there is a gap d2 in the X axis direction between the dielectric material 102-1 provided on the base portion 32-1 of the fixed electrode 32 and the dielectric material 104-2 provided on the tip portions of the electrode finger 34-2 of the movable electrode 34. It is noted that there are gaps dm1, dm2 in the Y axis direction between the electrode finger 32-2 of the fixed electrode 32 and the electrode finger 34-2 of the movable electrode 34.

Further, an overlapped thickness between the electrode fingers 32-2 and the electrode fingers 34-2 in the thickness direction, that is to say, the Z axis direction (i.e., a height of a part of the side wall of the electrode fingers 32-2 which are opposed to the side wall of the electrode fingers 34-2 in the Z axis direction) is Tm. It is noted that the thickness Tm on the side of the gap dm1 (i.e., Tm1) may be different from that on the side of the gap dm2 (i.e., Tm2). However, it is desirable that a relationship T1=T2=Tm (=Tm1=Tm2) is met.

In the embodiment, the displacement amount monitoring electrode 100 is configured such that the following criteria are met. In the course of the driven displacement of the movable electrode 34 with the target displacement amount A0 corresponding to the target amplitudes of the structure bodies 16, 18, the relationship between the drive displacement amount x of the movable electrode 34 and the capacitance change amount ΔC between the fixed electrode 32 and the movable electrode 34 includes the linear change area in which the capacitance change amount ΔC changes linearly with the driven displacement of the movable electrode 34 and the nonlinear change region in which the capacitance change amount ΔC changes nonlinearly. Further, a change sensitivity (gradient) of the capacitance change amount ΔC with respect to the drive displacement amount x of the movable electrode 34 in the nonlinear change region includes a characteristic of a change sensitivity which is greater than that of the linear change region. Further, the target capacitance change amount C0 between the fixed electrode 32 and the movable electrode 34 at the point of the movable electrode 34 reaching the target displacement amount A0 is set in the nonlinear change region in which the change sensitivity is higher than that of the linear change region.

Specifically, the construction of the displacement amount monitoring electrode 100 is configured to have such dimensions that meet following formula (5). However, if the thickness T1 of the electrode fingers 32-2 of the fixed electrode 32 and the thickness T2 of the electrode fingers 34-2 of the movable electrode 34 are constant regardless of the locations, and the thickness Tm1, Tm2 of the portions of the electrode fingers 32-2, 34-2 overlapped in the Z axis direction correspond to T1, T2, respectively, the relationship T1=T2=Tm1=Tm2 is established, and thus the dimensions that meet following formula (6) may be set.

$$\frac{T_{m1}}{d_{m1}} + \frac{T_{m2}}{d_{m2}} \leq \frac{\varepsilon_r \cdot w_1 \cdot T_1}{(d_1 - 2 \cdot d_\varepsilon)(d_1 - 2 \cdot d_\varepsilon - A_0)} + \frac{\varepsilon_r \cdot w_2 \cdot T_2}{(d_2 - 2 \cdot d_\varepsilon)(d_2 - 2 \cdot d_\varepsilon - A_0)} \quad (5)$$

$$\frac{1}{d_{m1}} + \frac{1}{d_{m2}} \leq \frac{\varepsilon_r \cdot w_1}{(d_1 - 2 \cdot d_\varepsilon)(d_1 - 2 \cdot d_\varepsilon - A_0)} + \frac{\varepsilon_r \cdot w_2}{(d_2 - 2 \cdot d_\varepsilon)(d_2 - 2 \cdot d_\varepsilon - A_0)} \quad (6)$$

According to such a configuration of the displacement amount monitoring electrode 100, the change sensitivity of the capacitance change amount ΔC with respect to the drive displacement amount x of the movable electrode 34 when the movable electrode 34 reaches near the target displacement amount A0 becomes higher with respect to a configuration in which the target capacitance change amount C0 is set in the linear change area. Further, if the tips of the electrode fingers 34-2 of the movable electrode 34 are further displaced to be closer to the base portion 32-1 of the fixed electrode 32 after the movable electrode has reached the target displacement amount A0, the change sensitivity of the capacitance change amount ΔC with respect to the drive displacement amount x of the movable electrode 34 increases with the displacement. Further, since the dielectric materials 102-1, 102-2, 104-1, 104-2 have a relative dielectric constant ∈r, which is higher than a relative dielectric constant of "1" of air (strictly speaking, a vacuum), the change sensitivity of the capacitance change amount ΔC with respect to the drive displacement amount x is increased due to the dielectric materials 102-1, 102-2, 104-1, 104-2.

Therefore, even if the gap and the opposed area between the fixed electrode 32 and the movable electrode 34 change due to the stress change or dimensional variation of the displacement amount monitoring electrode 100, the variation in the drive displacement amount x of the movable electrode 34 at the time when the capacitance change amount ΔC between the fixed electrode 32 and the movable electrode 34 reaches the target capacitance change amount C0 is further reduced. Thus, according to the displacement amount monitoring electrode 100 of the embodiment, more advantageous effects can be obtained with respect to the displacement amount monitoring electrode 10 of the first embodiment described above.

Further, if the dielectric materials 102-1, 102-2, 104-1, 104-2 in the displacement amount monitoring electrode 100 have high insulation characteristics, electrical connection between the fixed electrode 32 and the movable electrode 34 can be prevented due to the existence of the dielectric materials 102-1, 102-2, 104-1, 104-2 even when the fixed electrode 32 comes into collision with the movable electrode 34 due to manufacturing variations, control variations, application of excessive stress from the outside, etc. Thus, it is possible to detect the change in the capacitance between the fixed electrode 32 and the movable electrode 34 with high accuracy, and erroneous operations can be prevented in exciting the structure bodies 16, 18 in the X axis direction with respect to the semiconductor substrate 14.

Further, if the dielectric materials 102-1, 102-2, 104-1, 104-2 in the displacement amount monitoring electrode 100 have low modulus of elasticity or viscosity, impact which otherwise would be applied to the fixed electrode 32 and the movable electrode 34 can be absorbed due to the existence of the dielectric materials 102-1, 102-2, 104-1, 104-2 even when the fixed electrode 32 comes into collision with the movable electrode 34 due to manufacturing variations, control variations, application of excessive stress from the outside, etc., and thus breakages of the fixed electrode 32 and the movable electrode 34 can be prevented.

Figure 22:
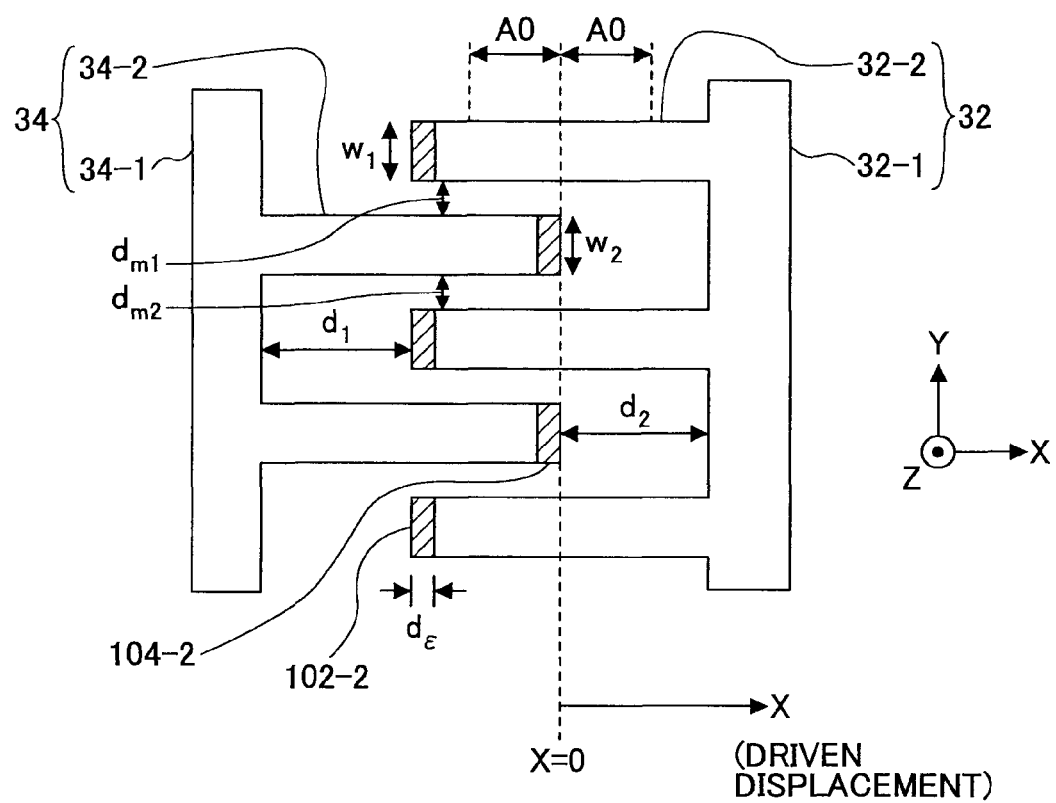
FIG. 22 is a plan view of a displacement amount monitoring electrode according to a variant.

It is noted that in the second embodiment, the fixed electrode 32 and the movable electrode 34 are configured such that the dielectric materials 102-1, 102-2, 104-1, 104-2 are provided on the surfaces of the base portions 32-1, 34-1 and the surfaces of the tip portions of the electrode fingers 32-2, 34-2. However, the present invention is not limited to this configuration. For example, as illustrated in FIG. 22, the fixed electrode 32 and the movable electrode 34 may be configured such that only the dielectric materials 102-2, 104-2 are provided on the surfaces of the tip portions of the electrode fingers 32-2, 34-2.

The construction of the displacement amount monitoring electrode according to the variant is configured to have such dimensions that meet the following criterion indicated by a formula (7). However, if the thickness T1 of the electrode fingers 32-2 of the fixed electrode 32 and the thickness T2 of the electrode fingers 34-2 of the movable electrode 34 are constant regardless of the locations, and the thickness Tm1, Tm2 of the portions of the electrode fingers 32-2, 34-2 overlapped in the Z axis direction correspond to T1, T2, respectively, the relationship T1=T2=Tm1=Tm2 is established, and thus the dimensions that meet a criteria indicated by the following formula (8) may be set.

$$\frac{T_{m1}}{d_{m1}} + \frac{T_{m2}}{d_{m2}} \leq \frac{\varepsilon_r \cdot w_1 \cdot T_1}{(d_1 - d_\varepsilon)(d_1 - d_\varepsilon - A_0)} + \frac{\varepsilon_r \cdot w_2 \cdot T_2}{(d_2 - d_\varepsilon)(d_2 - d_\varepsilon - A_0)} \quad (7)$$

$$\frac{1}{d_{m1}} + \frac{1}{d_{m2}} \leq \frac{\varepsilon_r \cdot w_1}{(d_1 - d_\varepsilon)(d_1 - d_\varepsilon - A_0)} + \frac{\varepsilon_r \cdot w_2}{(d_2 - d_\varepsilon)(d_2 - d_\varepsilon - A_0)} \quad (8)$$

According to such a configuration of the displacement amount monitoring electrode of the variant, the change sensitivity of the capacitance change amount ΔC with respect to the drive displacement amount x of the movable electrode 34 when the movable electrode reaches near the target displacement amount A0 becomes higher with respect to a configuration in which the target capacitance change amount C0 is set in the linear change area. Further, if the tips of the electrode fingers 34-2 of the movable electrode 34 are further displaced to be closer to the base portion 32-1 of the fixed electrode 32 after the movable electrode has reached the target displacement amount A0, the change sensitivity of the capacitance change amount ΔC with respect to the drive displacement amount x of the movable electrode 34 increases with the displacement. Further, since the dielectric materials 102-2, 104-2 have a relative dielectric constant ∈r, which is higher than a relative dielectric constant of "1" of air (strictly speaking, a vacuum), the change sensitivity of the capacitance change amount ΔC with respect to the drive displacement amount x is increased due to the dielectric materials 102-2, 104-2. Thus, according to the displacement amount monitoring electrode 100 of the variant, more advantageous effects can be obtained with respect to the displacement amount monitoring electrode 10 of the first embodiment described above.

Figure 23:
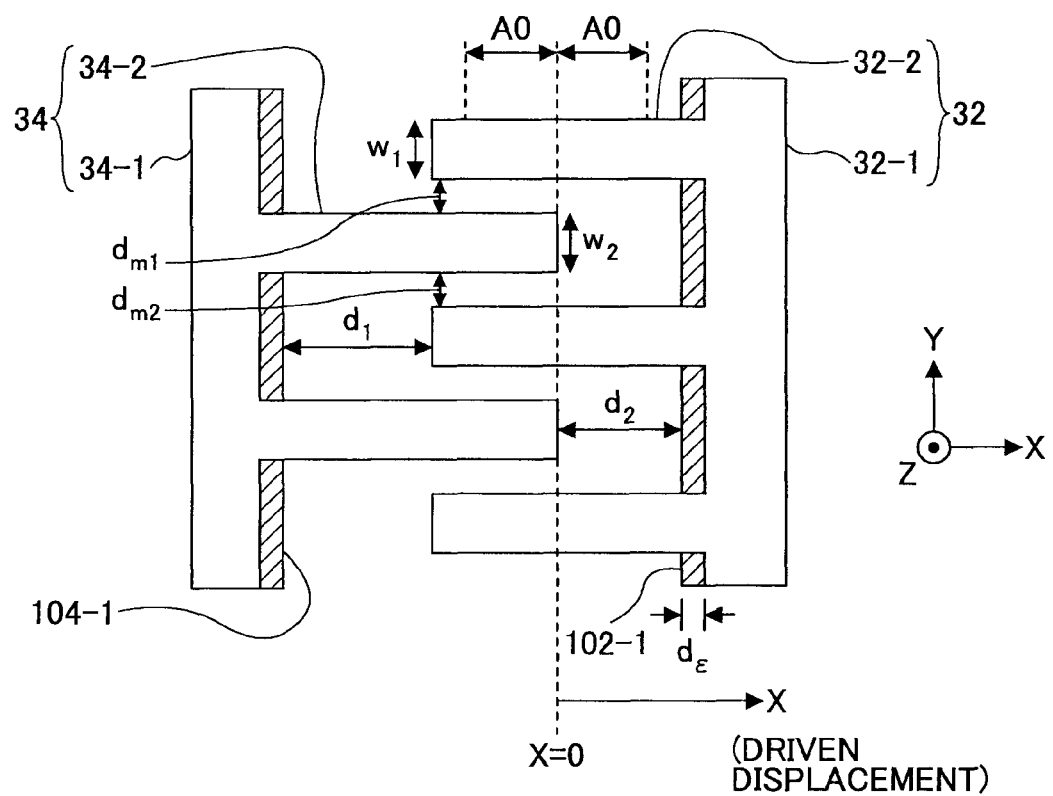
FIG. 23 is a plan view of a displacement amount monitoring electrode according to a variant.

Further, as illustrated in FIG. 23, the fixed electrode 32 and the movable electrode 34 may be configured such that only the dielectric materials 102-1, 104-1 are provided on the surfaces of the base portions 32-1, 34-1. The construction of the displacement amount monitoring electrode according to the variant may be configured to have such dimensions that meet the following criterion indicated by the formula (7) or (8).

Figure 24:
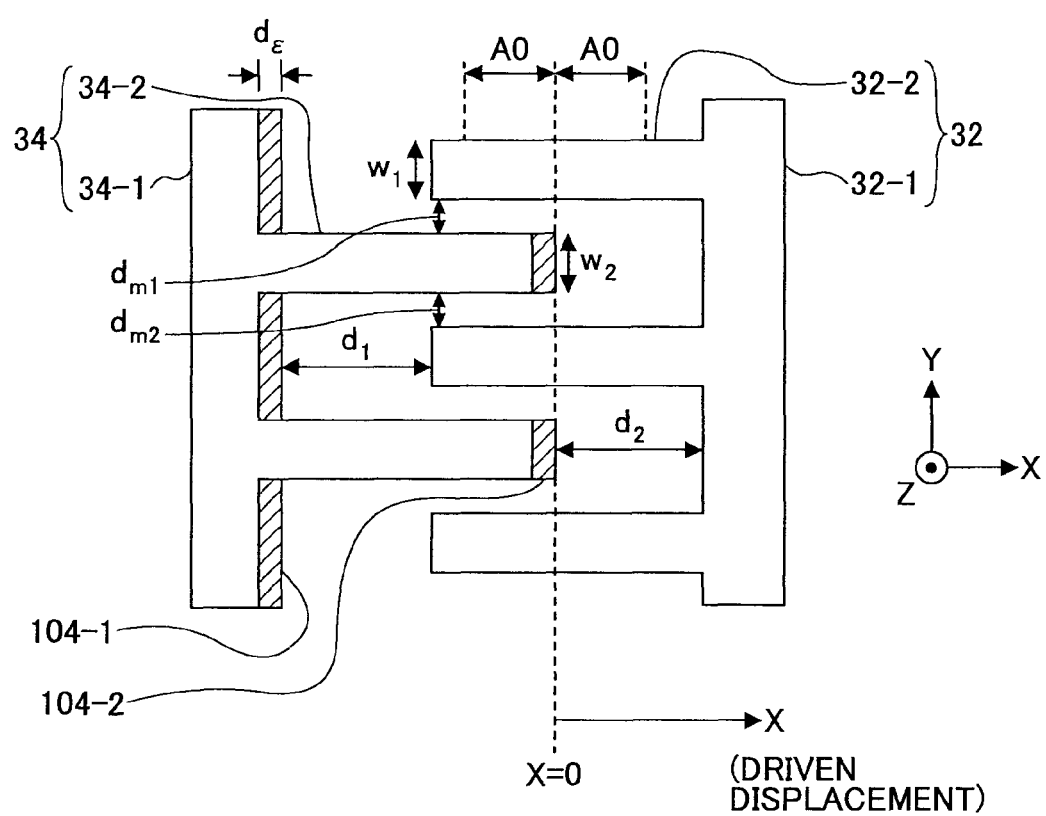
FIG. 24 is a plan view of a displacement amount monitoring electrode according to a variant.
Figure 25:
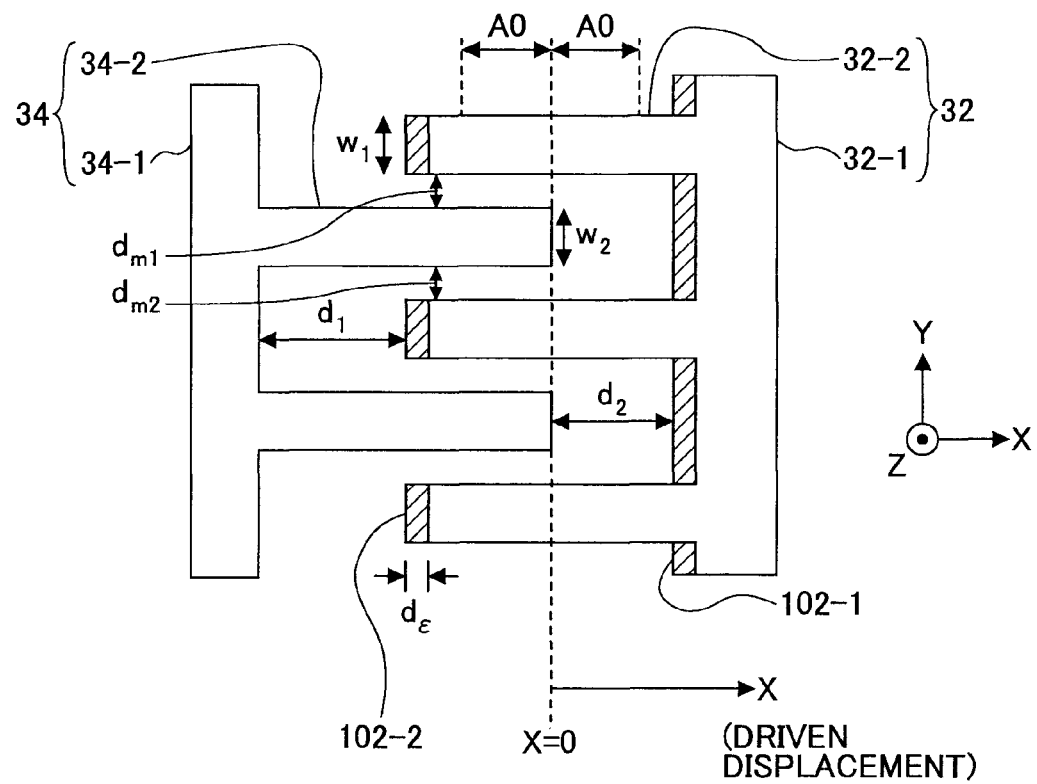
FIG. 25 is a plan view of a displacement amount monitoring electrode according to a variant.

Further, as illustrated in FIG. 24, only the movable electrode 34 may have the dielectric materials 104-1, 104-2 provided on the surface of the base portion 34-1 and the surfaces of the tip portions of the electrode fingers 34-2. Further, as illustrated in FIG. 25, only the fixed electrode 32 may have the dielectric materials 102-1, 102-2 provided on the surface of the base portion 32-1 and the surfaces of the tip portions of the electrode fingers 32-2. The constructions of the displacement amount monitoring electrodes according to these variants may be configured to have such dimensions that meet the following criterion indicated by the formula (7) or (8).

Further, in the second embodiment, the dielectric materials 102 of the fixed electrode 32 and the dielectric materials 104 of the movable electrode 34 have the same predetermined thickness $d\in$ in the X axis direction; however, the present invention is not limited to this configuration. For example, the dielectric materials 102, 104 may have different thickness $d\in 1$, $d\in 2$ in the X axis direction. Similarly, the dielectric materials 102 of the fixed electrode 32 and the dielectric materials 104 of the movable electrode 34 have the same relative dielectric constant $\in r$; however, the present invention is not limited to this configuration. For example, the dielectric materials 102, 104 may have different relative dielectric constants $\in r1$, $\in r2$.

Further, the second embodiment is applied to the configuration described in the first embodiment; however, it can be applied to the configurations of the variants illustrated in FIG. 7 through FIG. 18.

Further, in the first and second embodiments described above, the displacement amount monitoring electrodes 10, 100 are installed in the angular velocity sensor 12 for detecting the angular velocity; however, the present invention is not limited to this configuration. For example, it can be installed in other sensors which monitor the driven displacement amount of the structure body.

The invention claimed is:

1. A displacement amount monitoring electrode arrangement in which a fixed electrode fixed with respect to a substrate and a movable electrode configured to be movable in a predetermined axis direction parallel to the substrate, each of which has a comb shape formed by a base portion and plural electrode fingers extending from the base portion in the predetermined axis direction, are arranged such that the electrode fingers of the fixed electrode are engaged with the electrode fingers of the movable electrode, wherein the displacement amount monitoring electrode arrangement is configured to monitor a displacement amount of a detection mass which is to be driven to have a target amplitude based on a change amount of a capacitance between the fixed electrode and the movable electrode, there are at least one linear change region in which the change amount of the capacitance changes linearly with the displacement of the movable electrode in the predetermined axis direction, and at least one nonlinear change region in which the change amount of the capacitance changes nonlinearly with the displacement of the movable electrode in the predetermined axis direction, the nonlinear change region includes a characteristic in which a change sensitivity of the change amount of the capacitance with respect to the displacement amount of the movable electrode in the predetermined axis direction is greater than that in the linear change region, and a target capacitance change amount of the capacitance when the displacement of the movable electrode in the predetermined axis direction reaches a target displacement amount corresponding to the target amplitude is set in the nonlinear change region.

2. The displacement amount monitoring electrode arrangement of claim 1, wherein when $A_0$ represents the target displacement amount; $d_{m1}$ and $d_{m2}$ represent spaced distances between the electrode fingers of the fixed electrode and the electrode fingers of the movable electrode in a direction perpendicular to the predetermined axis direction; $T_{m1}$ and $T_{m2}$ represent thicknesses of portions of the electrode fingers of the fixed electrode and the movable electrode which are spaced from and opposed to each other; $S_1$ represents an area of portions of the electrode fingers of the fixed electrode which face the base portion of the movable electrode; $S_2$ represents an area of portions of the electrode fingers of the movable electrode which face the base portion of the fixed electrode; $d_1$ represents a distance between the base portion of the movable electrode and tip portions of the electrode fingers of the fixed electrode; and $d_2$ represents a distance between the base portion of the fixed electrode and tip portions of the electrode fingers of the movable electrode, the following formula (A) is met $$\frac{T_{m1}}{d_{m1}} + \frac{T_{m2}}{d_{m2}} \leq \frac{S_1}{d_1(d_1 - A_0)} + \frac{S_2}{d_2(d_2 - A_0)}. \tag{A}$$

3. The displacement amount monitoring electrode arrangement of claim 2, wherein the thicknesses of the electrode fingers of the fixed electrode and the thicknesses of the electrode fingers of the movable electrode are constant, $T_{m1}$ and $T_{m2}$ correspond to the thicknesses of the corresponding electrode fingers, and when $w_1$ represents a width of portions of the electrode fingers of the fixed electrode which face the base portion of the movable electrode; and $w_2$ represents a width of portions of the electrode fingers of the movable electrode which face the base portion of the fixed electrode, the following formula (B) is met $$\frac{1}{d_{m1}} + \frac{1}{d_{m2}} \leq \frac{w_1}{d_1(d_1 - A_0)} + \frac{w_2}{d_2(d_2 - A_0)}. \tag{B}$$

4. The displacement amount monitoring electrode arrangement of claim 2, wherein if the fixed electrode and the movable electrode are disposed such that the electrode fingers of the fixed electrode are not opposed to the electrode fingers of the movable electrode in the direction perpendicular to the predetermined axis direction, the following formula (C) is met $$0 \leq \frac{S_1}{d_1(d_1 - A_0)} + \frac{S_2}{d_2(d_2 - A_0)}. \tag{C}$$

5. The displacement amount monitoring electrode arrangement of claim 1, wherein the electrode fingers of at least one of the fixed electrode and the movable electrode are formed such that an area of tip portions opposed to the base portion of the movable electrode or the fixed electrode is greater than an area of a cross sectional of portions other than the tip portions.

6. The displacement amount monitoring electrode arrangement of claim 1, wherein at least one of tip portions and the base portion of at least one of the fixed electrode and the movable electrode have surfaces on which dielectric materials are provided.

7. The displacement amount monitoring electrode arrangement of claim 6, wherein when $A_0$ represents the target displacement amount; $d_{m1}$ and $d_{m2}$ represent spaced distances between the electrode fingers of the fixed electrode and the electrode fingers of the movable electrode in a direction perpendicular to the predetermined axis direction; $T_{m1}$ and $T_{m2}$ represent thicknesses of portions of the electrode fingers of the fixed electrode and the movable electrode which are spaced from and opposed to each other; $S_1$ represents an area of portions of the electrode fingers of the fixed electrode which face the base portion of the movable electrode; $S_2$ represents an area of portions of the electrode fingers of the movable electrode which face the base portion of the fixed electrode; $d_1$ represents a distance between the base portion of the movable electrode and tip portions of the electrode fingers of the fixed electrode; $d_2$ represents a distance between the base portion of the fixed electrode and tip portions of the electrode fingers of the movable electrode; and $d_\varepsilon$ and $\varepsilon_r$ respectively represent a thickness and a relative dielectric constant of the dielectric materials provided on the respective surfaces of the tip portions and the base portions of the fixed electrode and the movable electrode, the following formula (D) is met $$\frac{T_{m1}}{d_{m1}} + \frac{T_{m2}}{d_{m2}} \leq \frac{\varepsilon_r \cdot S_1}{(d_1 - 2 \cdot d_\varepsilon)(d_1 - 2 \cdot d_\varepsilon - A_0)} + \frac{\varepsilon_r \cdot S_2}{(d_2 - 2 \cdot d_\varepsilon)(d_2 - 2 \cdot d_\varepsilon - A_0)}. \tag{D}$$

* * * * *